US010044458B2

(12) United States Patent
Su et al.

(10) Patent No.: US 10,044,458 B2
(45) Date of Patent: Aug. 7, 2018

(54) DATA MIGRATION METHOD AND COMMUNICATIONS NODE

(71) Applicant: Huawei Technologies Co., Ltd., Shenzhen (CN)

(72) Inventors: Wei Su, Amsterdam (NL); Qiuyou Wu, Shenzhen (CN); Limin Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 15/067,666

(22) Filed: Mar. 11, 2016

(65) Prior Publication Data

US 2016/0197691 A1 Jul. 7, 2016

Related U.S. Application Data

(63) Continuation of application No. PCT/CN2014/085973, filed on Sep. 5, 2014.

(30) Foreign Application Priority Data

Sep. 13, 2013 (CN) .......................... 2013 1 0418549

(51) Int. Cl.
*H04J 3/16* (2006.01)
*H04Q 11/00* (2006.01)
(52) U.S. Cl.
CPC ........ *H04J 3/1652* (2013.01); *H04Q 11/0066* (2013.01); *H04J 2203/0069* (2013.01);
(Continued)

(58) Field of Classification Search
None
See application file for complete search history.

(56) References Cited

U.S. PATENT DOCUMENTS

2004/0165540 A1* 8/2004 Acharya ............. H04L 12/5602
370/252
2006/0165122 A1* 7/2006 Gupta ................... H04J 3/1611
370/468

(Continued)

FOREIGN PATENT DOCUMENTS

CN 101146368 A 3/2008
CN 101155016 A 4/2008

(Continued)

OTHER PUBLICATIONS

"Spectral grids for WDM applications: DWDM frequency grid", Recommendation ITU-T G.694.1, Feb. 2012, 13 pages.

(Continued)

*Primary Examiner* — Kodzovi Acolatse

(57) ABSTRACT

Embodiments of the present invention provide a data migration method and a communications node. The method includes: determining, by a first node in an OPUCn signal, a second tributary slot corresponding to a first tributary slot, where the second tributary slot is an idle tributary slot; and migrating, by the first node, a first low-order ODU service from the first tributary slot to the second tributary slot. In the embodiments of the present invention, by migrating, in an OPUCn signal, a first low-order ODU service of a first tributary slot to an idle second tributary slot, the existence of tributary slot fragments can be avoided, thereby improving utilization of network bandwidth resources.

17 Claims, 17 Drawing Sheets

(52) U.S. Cl.
CPC ........... *H04J 2203/0091* (2013.01); *H04Q 2011/0086* (2013.01)

(56) References Cited

U.S. PATENT DOCUMENTS

| | | |
|---|---|---|
| 2008/0247754 A1 | 10/2008 | Sun et al. |
| 2010/0142947 A1 | 6/2010 | Shin et al. |
| 2010/0183301 A1 | 7/2010 | Shin et al. |
| 2010/0221005 A1 | 9/2010 | Zhao |
| 2011/0286744 A1* | 11/2011 | Shin ............... H04J 3/1652 398/45 |
| 2012/0082455 A1 | 4/2012 | Bardalai et al. |
| 2012/0162812 A1* | 6/2012 | Mizumoto ........... G11B 21/22 360/75 |
| 2012/0183291 A1 | 7/2012 | Tochio |
| 2013/0195458 A1* | 8/2013 | Luo ............... H04J 3/1652 398/66 |

FOREIGN PATENT DOCUMENTS

| | | |
|---|---|---|
| CN | 102255809 A | 11/2011 |
| CN | 102893629 A | 1/2013 |
| CN | 103533464 A | 1/2014 |
| EP | 2 472 767 A1 | 7/2012 |

OTHER PUBLICATIONS

"Spectral grids for WDM applications: CWDM wavelength grid", ITU-T Recommendation G.694.2, Dec. 2003, 10 pages.

Maarten Vissers et al., "OPUCn tributary slot definition considerations", Feb. 25, 2013, 11 pages.

\* cited by examiner

| OMFI bits 5678 | Multiframe Row | Column Row | 1 | ... | 14n | 14n+1 | 14n+2 | ... | 15n | 15n+1 | 15n+2 | ... | 16n | 16n+1 | 16n+2 | ... | 17n | 17n+1 | 17n+2 | ... | 18n | ... |
|---|---|---|---|---|---|---|---|---|---|---|---|---|---|---|---|---|---|---|---|---|---|---|
| 0000 | 1 | 1 | | | TSOH TS1 | TSOH TS11 | ... | TSOH TS[10(n-1)+1] | TSOH TS1 | TSOH TS11 | ... | TSOH TS[10(n-1)+1] | 1 | 11 | ... | 10(n-1)+1 | 2 | 12 | ... | 10(n-1)+2 | ... |
| | 2 | 2 | | | | | | | | | | | | | | | | | | | |
| | 3 | 3 | | | | | | | | | | | | | | | | | | | |
| | 4 | 4 | | | PSI | PSI | ... | PSI | OMFI | OMFI | ... | OMFI | | | | | | | | | |
| 0001 | 5 | 1 | | | TSOH TS2 | TSOH TS12 | ... | TSOH TS[10(n-1)+2] | TSOH TS2 | TSOH TS12 | ... | TSOH TS[10(n-1)+2] | 1 | 11 | ... | 10(n-1)+1 | 2 | 12 | ... | 10(n-1)+2 | ... |
| | 6 | 2 | | | | | | | | | | | | | | | | | | | |
| | 7 | 3 | | | | | | | | | | | | | | | | | | | |
| | 8 | 4 | | | PSI | PSI | ... | PSI | OMFI | OMFI | ... | OMFI | | | | | | | | | |
| 0010 | 9 | 1 | | | TSOH TS3 | TSOH TS13 | ... | TSOH TS[10(n-1)+3] | TSOH TS3 | TSOH TS13 | ... | TSOH TS[10(n-1)+3] | 1 | 11 | ... | 10(n-1)+1 | 2 | 12 | ... | 10(n-1)+2 | ... |
| | 10 | 2 | | | | | | | | | | | | | | | | | | | |
| | 11 | 3 | | | | | | | | | | | | | | | | | | | |
| | 12 | 4 | | | PSI | PSI | ... | PSI | OMFI | OMFI | ... | OMFI | | | | | | | | | |
| 0011 | 13 | 1 | | | TSOH TS4 | TSOH TS14 | ... | TSOH TS[10(n-1)+4] | TSOH TS4 | TSOH TS14 | ... | TSOH TS[10(n-1)+4] | 1 | 11 | ... | 10(n-1)+1 | 2 | 12 | ... | 10(n-1)+2 | ... |
| | 14 | 2 | | | | | | | | | | | | | | | | | | | |
| | 15 | 3 | | | | | | | | | | | | | | | | | | | |
| | 16 | 4 | | | PSI | PSI | ... | PSI | OMFI | OMFI | ... | OMFI | | | | | | | | | |
| 0100 | 17 | 1 | | | TSOH TS5 | TSOH TS15 | ... | TSOH TS[10(n-1)+5] | TSOH TS5 | TSOH TS15 | ... | TSOH TS[10(n-1)+5] | 1 | 11 | ... | 10(n-1)+1 | 2 | 12 | ... | 10(n-1)+2 | ... |
| | 18 | 2 | | | | | | | | | | | | | | | | | | | |
| | 19 | 3 | | | | | | | | | | | | | | | | | | | |
| | 20 | 4 | | | PSI | PSI | ... | PSI | OMFI | OMFI | ... | OMFI | | | | | | | | | |
| 0101 | 21 | 1 | | | TSOH TS6 | TSOH TS16 | ... | TSOH TS[10(n-1)+6] | TSOH TS6 | TSOH TS16 | ... | TSOH TS[10(n-1)+6] | 1 | 11 | ... | 10(n-1)+1 | 2 | 12 | ... | 10(n-1)+2 | ... |
| | 22 | 2 | | | | | | | | | | | | | | | | | | | |
| | 23 | 3 | | | | | | | | | | | | | | | | | | | |
| | 24 | 4 | | | PSI | PSI | ... | PSI | OMFI | OMFI | ... | OMFI | | | | | | | | | |
| 0110 | 25 | 1 | | | TSOH TS7 | TSOH TS17 | ... | TSOH TS[10(n-1)+7] | TSOH TS7 | TSOH TS17 | ... | TSOH TS[10(n-1)+7] | 1 | 11 | ... | 10(n-1)+1 | 2 | 12 | ... | 10(n-1)+2 | ... |
| | 26 | 2 | | | | | | | | | | | | | | | | | | | |
| | 27 | 3 | | | | | | | | | | | | | | | | | | | |
| | 28 | 4 | | | PSI | PSI | ... | PSI | OMFI | OMFI | ... | OMFI | | | | | | | | | |
| 0111 | 29 | 1 | | | TSOH TS8 | TSOH TS18 | ... | TSOH TS[10(n-1)+8] | TSOH TS8 | TSOH TS18 | ... | TSOH TS[10(n-1)+8] | 1 | 11 | ... | 10(n-1)+1 | 2 | 12 | ... | 10(n-1)+2 | ... |
| | 30 | 2 | | | | | | | | | | | | | | | | | | | |
| | 31 | 3 | | | | | | | | | | | | | | | | | | | |
| | 32 | 4 | | | PSI | PSI | ... | PSI | OMFI | OMFI | ... | OMFI | | | | | | | | | |
| 1000 | 33 | 1 | | | TSOH TS9 | TSOH TS19 | ... | TSOH TS[10(n-1)+9] | TSOH TS9 | TSOH TS19 | ... | TSOH TS[10(n-1)+9] | 1 | 11 | ... | 10(n-1)+1 | 2 | 12 | ... | 10(n-1)+2 | ... |
| | 34 | 2 | | | | | | | | | | | | | | | | | | | |
| | 35 | 3 | | | | | | | | | | | | | | | | | | | |
| | 36 | 4 | | | PSI | PSI | ... | PSI | OMFI | OMFI | ... | OMFI | | | | | | | | | |
| 1001 | 37 | 1 | | | TSOH TS10 | TSOH TS20 | ... | TSOH TS10n | TSOH TS10 | TSOH TS20 | ... | TSOH TS10n | 1 | 11 | ... | 10(n-1)+1 | 2 | 12 | ... | 10(n-1)+2 | ... |
| | 38 | 2 | | | | | | | | | | | | | | | | | | | |
| | 39 | 3 | | | | | | | | | | | | | | | | | | | |
| | 40 | 4 | | | PSI | PSI | ... | PSI | OMFI | OMFI | ... | OMFI | | | | | | | | | |

FIG. 3a

| 25n+1 | 25n+2 | ... | 26n | 26n+1 | 26n+2 | ... | 27n | 27n+1 | 27n+2 | ... | 28n | ... | 35n+1 | 35n+2 | ... | 36n | ... |
|---|---|---|---|---|---|---|---|---|---|---|---|---|---|---|---|---|---|
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |
| 10 | 20 | ... | 10n | 1 | 11 | ... | $10(n-1)+1$ | 2 | 12 | ... | $10(n-1)+2$ | ... | 10 | 20 | ... | 10n | ... |

FIG. 3b

| 3806n+1 | 3806n+2 | ... | 3807n | 3807n+1 | 3807n+2 | ... | 3808n | ... | 3815n+1 | 3815n+2 | ... | 3816n | 3816n+1 | ... | 3824n |
|---|---|---|---|---|---|---|---|---|---|---|---|---|---|---|---|
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |
| 1 | 11 | ... | 10(n-1)+1 | 2 | 12 | ... | 10(n-1)+2 | ... | 10 | 20 | ... | 10n | FS | | |

FIG. 3c

| OMFI bits 5678 | Multiframe Row | Column Row | 1 | ... | 14n | 14n+1 | 14n+2 | ... | 15n | 15n+1 | 15n+2 | ... |
|---|---|---|---|---|---|---|---|---|---|---|---|---|
| 0000 | 1 | 1 | | ... | TSOH TS1 | TSOH TS11 | | ... | TSOH TS[10(n-1)+1] | TSOH TS1 | TSOH TS11 | ... |
| | 2 | 2 | | | | | | | | | | |
| | 3 | 3 | | | | | | | | | | |
| | 4 | 4 | | | PSI | PSI | | ... | PSI | OMFI | OMFI | ... |
| 0001 | 5 | 1 | | | TSOH TS2 | TSOH TS12 | | ... | TSOH TS[10(n-1)+2] | TSOH TS2 | TSOH TS12 | ... |
| | 6 | 2 | | | | | | | | | | |
| | 7 | 3 | | | | | | | | | | |
| | 8 | 4 | | | PSI | PSI | | ... | PSI | OMFI | OMFI | ... |
| 0010 | 9 | 1 | | | TSOH TS3 | TSOH TS13 | | ... | TSOH TS[10(n-1)+3] | TSOH TS3 | TSOH TS13 | ... |
| | 10 | 2 | | | | | | | | | | |
| | 11 | 3 | | | | | | | | | | |
| | 12 | 4 | | | PSI | PSI | | ... | PSI | OMFI | OMFI | ... |
| 0011 | 13 | 1 | | | TSOH TS4 | TSOH TS14 | | ... | TSOH TS[10(n-1)+4] | TSOH TS4 | TSOH TS14 | ... |
| | 14 | 2 | | | | | | | | | | |
| | 15 | 3 | | | | | | | | | | |
| | 16 | 4 | | | PSI | PSI | | ... | PSI | OMFI | OMFI | ... |
| 0100 | 17 | 1 | | | TSOH TS5 | TSOH TS15 | | ... | TSOH TS[10(n-1)+5] | TSOH TS5 | TSOH TS15 | ... |
| | 18 | 2 | | | | | | | | | | |
| | 19 | 3 | | | | | | | | | | |
| | 20 | 4 | | | PSI | PSI | | ... | PSI | OMFI | OMFI | ... |
| 0101 | 21 | 1 | | | TSOH TS6 | TSOH TS16 | | ... | TSOH TS[10(n-1)+6] | TSOH TS6 | TSOH TS16 | ... |
| | 22 | 2 | | | | | | | | | | |
| | 23 | 3 | | | | | | | | | | |
| | 24 | 4 | | | PSI | PSI | | ... | PSI | OMFI | OMFI | ... |
| 0110 | 25 | 1 | | | TSOH TS7 | TSOH TS17 | | ... | TSOH TS[10(n-1)+7] | TSOH TS7 | TSOH TS17 | ... |
| | 26 | 2 | | | | | | | | | | |
| | 27 | 3 | | | | | | | | | | |
| | 28 | 4 | | | PSI | PSI | | ... | PSI | OMFI | OMFI | ... |
| 0111 | 29 | 1 | | | TSOH TS8 | TSOH TS18 | | ... | TSOH TS[10(n-1)+8] | TSOH TS8 | TSOH TS18 | ... |
| | 30 | 2 | | | | | | | | | | |
| | 31 | 3 | | | | | | | | | | |
| | 32 | 4 | | | PSI | PSI | | ... | PSI | OMFI | OMFI | ... |
| 1000 | 33 | 1 | | | TSOH TS9 | TSOH TS19 | | ... | TSOH TS[10(n-1)+9] | TSOH TS9 | TSOH TS19 | ... |
| | 34 | 2 | | | | | | | | | | |
| | 35 | 3 | | | | | | | | | | |
| | 36 | 4 | | | PSI | PSI | | ... | PSI | OMFI | OMFI | ... |
| 1001 | 37 | 1 | | | TSOH TS10 | TSOH TS20 | | ... | TSOH TS10n | TSOH TS10 | TSOH TS20 | ... |
| | 38 | 2 | | | | | | | | | | |
| | 39 | 3 | | | | | | | | | | |
| | 40 | 4 | | | PSI | PSI | | ... | PSI | OMFI | OMFI | ... |

FIG. 4a

| | | 16n | 16n+1 | 16n+2 | ... | 17n | 17n+1 | 17n+2 | ... | 18n | ... |
|---|---|---|---|---|---|---|---|---|---|---|---|
| TSOH | TS[10(n-1)+1] | 1 | 11 | ... | 10(n-1)+1 | 2 | 12 | ... | 10(n-1)+2 | ... |
| | | 9 | 19 | ... | 10(n-1)+9 | 10 | 20 | ... | 10n | ... |
| | | 7 | 17 | ... | 10(n-1)+7 | 8 | 18 | ... | 10(n-1)+8 | ... |
| OMFI | | 5 | 15 | ... | 10(n-1)+5 | 6 | 16 | ... | 10(n-1)+6 | ... |
| TSOH | TS[10(n-1)+2] | 3 | 13 | ... | 10(n-1)+3 | 4 | 14 | ... | 10(n-1)+4 | ... |
| | | 1 | 11 | ... | 10(n-1)+1 | 2 | 12 | ... | 10(n-1)+2 | ... |
| | | 9 | 19 | ... | 10(n-1)+9 | 10 | 20 | ... | 10n | ... |
| OMFI | | 7 | 17 | ... | 10(n-1)+7 | 8 | 18 | ... | 10(n-1)+8 | ... |
| TSOH | TS[10(n-1)+3] | 5 | 15 | ... | 10(n-1)+5 | 6 | 16 | ... | 10(n-1)+6 | ... |
| | | 3 | 13 | ... | 10(n-1)+3 | 4 | 14 | ... | 10(n-1)+4 | ... |
| | | 1 | 11 | ... | 10(n-1)+1 | 2 | 12 | ... | 10(n-1)+2 | ... |
| OMFI | | 9 | 19 | ... | 10(n-1)+9 | 10 | 20 | ... | 10n | ... |
| TSOH | TS[10(n-1)+4] | 7 | 17 | ... | 10(n-1)+7 | 8 | 18 | ... | 10(n-1)+8 | ... |
| | | 5 | 15 | ... | 10(n-1)+5 | 6 | 16 | ... | 10(n-1)+6 | ... |
| | | 3 | 13 | ... | 10(n-1)+3 | 4 | 14 | ... | 10(n-1)+4 | ... |
| OMFI | | 1 | 11 | ... | 10(n-1)+1 | 2 | 12 | ... | 10(n-1)+2 | ... |
| TSOH | TS[10(n-1)+5] | 9 | 19 | ... | 10(n-1)+9 | 10 | 20 | ... | 10n | ... |
| | | 7 | 17 | ... | 10(n-1)+7 | 8 | 18 | ... | 10(n-1)+8 | ... |
| | | 5 | 15 | ... | 10(n-1)+5 | 6 | 16 | ... | 10(n-1)+6 | ... |
| OMFI | | 3 | 13 | ... | 10(n-1)+3 | 4 | 14 | ... | 10(n-1)+4 | ... |
| TSOH | TS[10(n-1)+6] | 1 | 11 | ... | 10(n-1)+1 | 2 | 12 | ... | 10(n-1)+2 | ... |
| | | 9 | 19 | ... | 10(n-1)+9 | 10 | 20 | ... | 10n | ... |
| | | 7 | 17 | ... | 10(n-1)+7 | 8 | 18 | ... | 10(n-1)+8 | ... |
| OMFI | | 5 | 15 | ... | 10(n-1)+5 | 6 | 16 | ... | 10(n-1)+6 | ... |
| TSOH | TS[10(n-1)+7] | 3 | 13 | ... | 10(n-1)+3 | 4 | 14 | ... | 10(n-1)+4 | ... |
| | | 1 | 11 | ... | 10(n-1)+1 | 2 | 12 | ... | 10(n-1)+2 | ... |
| | | 9 | 19 | ... | 10(n-1)+9 | 10 | 20 | ... | 10n | ... |
| OMFI | | 7 | 17 | ... | 10(n-1)+7 | 8 | 18 | ... | 10(n-1)+8 | ... |
| TSOH | TS[10(n-1)+8] | 5 | 15 | ... | 10(n-1)+5 | 6 | 16 | ... | 10(n-1)+6 | ... |
| | | 3 | 13 | ... | 10(n-1)+3 | 4 | 14 | ... | 10(n-1)+4 | ... |
| | | 1 | 11 | ... | 10(n-1)+1 | 2 | 12 | ... | 10(n-1)+2 | ... |
| OMFI | | 9 | 19 | ... | 10(n-1)+9 | 10 | 20 | ... | 10n | ... |
| TSOH | TS[10(n-1)+9] | 7 | 17 | ... | 10(n-1)+7 | 8 | 18 | ... | 10(n-1)+8 | ... |
| | | 5 | 15 | ... | 10(n-1)+5 | 6 | 16 | ... | 10(n-1)+6 | ... |
| | | 3 | 13 | ... | 10(n-1)+3 | 4 | 14 | ... | 10(n-1)+4 | ... |
| OMFI | | 1 | 11 | ... | 10(n-1)+1 | 2 | 12 | ... | 10(n-1)+2 | ... |
| TSOH | TS 10n | 9 | 19 | ... | 10(n-1)+9 | 10 | 20 | ... | 10n | ... |
| | | 7 | 17 | ... | 10(n-1)+7 | 8 | 18 | ... | 10(n-1)+8 | ... |
| | | 5 | 15 | ... | 10(n-1)+5 | 6 | 16 | ... | 10(n-1)+6 | ... |
| OMFI | | 3 | 13 | ... | 10(n-1)+3 | 4 | 14 | ... | 10(n-1)+4 | ... |

FIG. 4b

| 25n+1 | 25n+2 | ... | 26n | 26n+1 | 26n+2 | ... | 27n | 27n+1 | 27n+2 | ... | 28n | ... |
|---|---|---|---|---|---|---|---|---|---|---|---|---|
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |
| 10 | 20 | ... | 10n | 1 | 11 | ... | 10(n-1)+1 | 2 | 12 | ... | 10(n-1)+2 | ... |
| 8 | 18 | ... | 10(n-1)+8 | 9 | 19 | ... | 10(n-1)+9 | 10 | 20 | ... | 10n | ... |
| 6 | 16 | ... | 10(n-1)+6 | 7 | 17 | ... | 10(n-1)+7 | 8 | 18 | ... | 10(n-1)+8 | ... |
| 4 | 14 | ... | 10(n-1)+4 | 5 | 15 | ... | 10(n-1)+5 | 6 | 16 | ... | 10(n-1)+6 | ... |
| 2 | 12 | ... | 10(n-1)+2 | 3 | 13 | ... | 10(n-1)+3 | 4 | 14 | ... | 10(n-1)+4 | ... |

FIG. 4c

| 3815n+1 | 3815n+2 | ... | 3816n | 3816n+1 | 3816n+2 | ... | 3817n | 3817n+1 | 3817n+2 | ... | 3818n | 3818n+1 | 3818n+2 | ... |
|---|---|---|---|---|---|---|---|---|---|---|---|---|---|---|
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |
| 10 | 20 | ... | 10n | 1 | 11 | ... | 10(n-1)+1 | 2 | 12 | ... | 10(n-1)+2 | 3 | 13 | ... |
| 8 | 18 | ... | 10(n-1)+8 | 9 | 19 | ... | 10(n-1)+9 | 10 | 20 | ... | 10n | 1 | 11 | ... |
| 6 | 16 | ... | 10(n-1)+6 | 7 | 17 | ... | 10(n-1)+7 | 8 | 18 | ... | 10(n-1)+8 | 9 | 19 | ... |
| 4 | 14 | ... | 10(n-1)+4 | 5 | 15 | ... | 10(n-1)+5 | 6 | 16 | ... | 10(n-1)+6 | 7 | 17 | ... |
| 2 | 12 | ... | 10(n-1)+2 | 3 | 13 | ... | 10(n-1)+3 | 4 | 14 | ... | 10(n-1)+4 | 5 | 15 | ... |

FIG. 4d

| 3819n | 3819n+1 | 3819n+2 | ... | 3820n | 3820n+1 | 3820n+2 | ... | 3821n | 3821n+1 | 3821n+2 | ... |
|---|---|---|---|---|---|---|---|---|---|---|---|
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |
| 10(n-1)+3 | 4 | 14 | ... | 10(n-1)+4 | 5 | 15 | ... | 10(n-1)+5 | 6 | 16 | ... |
| 10(n-1)+1 | 2 | 12 | ... | 10(n-1)+2 | 3 | 13 | ... | 10(n-1)+3 | 4 | 14 | ... |
| 10(n-1)+9 | 10 | 20 | ... | 10n | 1 | 11 | ... | 10(n-1)+1 | 2 | 12 | ... |
| 10(n-1)+7 | 8 | 18 | ... | 10(n-1)+8 | 9 | 19 | ... | 10(n-1)+9 | 10 | 20 | ... |
| 10(n-1)+5 | 6 | 16 | ... | 10(n-1)+6 | 7 | 17 | ... | 10(n-1)+7 | 8 | 18 | ... |

FIG. 4e

| 3822n | 3822n+1 | 3822n+2 | ... | 3823n | 3823n+1 | 3823n+2 | ... | 3824n | |
|---|---|---|---|---|---|---|---|---|---|
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #1 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #2 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #3 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #4 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #5 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #6 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #7 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |
| 10(n-1)+6 | 7 | 17 | ... | 10(n-1)+7 | 8 | 18 | ... | 10(n-1)+8 | |
| 10(n-1)+4 | 5 | 15 | ... | 10(n-1)+5 | 6 | 16 | ... | 10(n-1)+6 | 5 rows Superrow #8 |
| 10(n-1)+2 | 3 | 13 | ... | 10(n-1)+3 | 4 | 14 | ... | 10(n-1)+4 | |
| 10n | 1 | 11 | ... | 10(n-1)+1 | 2 | 12 | ... | 10(n-1)+2 | |
| 10(n-1)+8 | 9 | 19 | ... | 10(n-1)+9 | 10 | 20 | ... | 10n | |

FIG. 4f

|  | 1 | 2 | 3 | 4 | 5 | 6 | 7 | 8 |  |
|---|---|---|---|---|---|---|---|---|---|
| PSI[2i] | Occupation | | | | | | | | |
| PSI[1+2i] | | Tributary port | | | | | | | TS #[10(j-1)+i] |
|  | 0: unspecified<br>1: specified | 0000 0000 0000 0000: Tributary port 1<br>0000 0000 0000 0001: Tributary port 2<br>...<br>xxxx xxxx xxxx xxxx: Tributary port 10n | | | | | | | |

FIG. 7

| Row\Column | 15 | 1 | 2 | 3 | 4 | 5 | 6 | 7 | 8 |
|---|---|---|---|---|---|---|---|---|---|
| 1 | TSOH | MCTRL | | RESP | MTSID | | | | |
| 2 | TSOH | MTSID | | | | | | | |
| 3 | TSOH | CRC | | | | | | | |
| 4 | PSI | | | | | | | | |

FIG. 8

DATA MIGRATION METHOD AND COMMUNICATIONS NODE

CROSS-REFERENCE TO RELATED APPLICATIONS

This application is a continuation of International Application No. PCT/CN2014/085973, filed on Sep. 5, 2014, which claims priority to Chinese Patent Application No. 201310418549.8, filed on Sep. 13, 2013, both of which are hereby incorporated by reference in their entireties.

TECHNICAL FIELD

The present invention relates to the field of communications, and in particular, to a data migration method and a communications node.

BACKGROUND

As a core technology of a next-generation transport network, an optical transport network (OTN) has rich operation, administration and maintenance capabilities, a powerful tandem connection monitoring capability, and the like, and can implement flexible scheduling and management on large-capacity services.

The OTN technology defines a standard frame structure to map various client services. First, an optical channel payload unit (OPU) overhead is added to a client service to form an optical channel payload unit-k (OPUk), and then the OPUk is encapsulated, an optical channel data unit (ODU) overhead is added to form an optical channel data unit-k (ODUk), and then an optical channel transport unit (Optical Channel Transport Unit, OTU) overhead is added to the ODUk to form an optical channel transport unit-k (OTUk). k=1, 2, 3, and 4, which are corresponding to four fixed rate levels, namely, 2.5 Gbit/s, 10 Gbit/s, 40 Gbit/s and 100 Gbit/s respectively.

With a massive growth of service traffic, to fully utilize bandwidth resources of the OTN, currently, the Study Group 15/International Telecommunication Union-Telecommunication Standardization Sector (Study Group 15/International Telecommunication Union-Telecommunication Standardization Sector, SG15/ITU-T) is discussing to develop an optical channel transport unit-Cn (OTUCn) signal with a flexible line rate. A bit rate of the OTUCn signal is n multiples of a reference rate, and n is variable, where the reference rate may be preferably a rate at a rate level of 100 Gbit/s, and the foregoing C is the number "100". Corresponding to the OTUCn signal, there are an optical channel data unit-Cn (ODUCn) signal and an optical channel payload unit-Cn (OPUCn) signal. The OPUCn signal may be split into 10n 10 G tributary slots, to implement hybrid carrying for multiple low-order services. Because various low-order services occupy tributary slots (TS) of the OPUCn randomly, tributary slot fragments may exist in the OPUCn signal, or after some low-order services are canceled, tributary slot fragments may also exist in the OPUCn signal. Because of the existence of these tributary slot fragments, network bandwidth resources cannot be allocated according to requirements of actually carried low-order ODU services, which decreases utilization of the network bandwidth resources.

SUMMARY

Embodiments of the present invention provide a data migration method and a communications node, which can improve utilization of network bandwidth resources.

According to a first aspect, a data migration method is provided, including: determining, by a first node in an OPUCn signal, a second tributary slot corresponding to a first tributary slot, where the second tributary slot is an idle tributary slot; and migrating, by the first node, a first low-order ODU service from the first tributary slot to the second tributary slot.

With reference to the first aspect, in a first possible implementation manner, the determining a second tributary slot corresponding to a first tributary slot includes: determining, by the first node, idle tributary slots in the OPUCn signal according to a payload structure identifier of the OPUCn signal; and selecting, by the first node, the second tributary slot from the idle tributary slots.

With reference to the first aspect or the first possible implementation manner of the first aspect, in a second possible implementation manner, before the migrating, by the first node, a first low-order ODU service from the first tributary slot to the second tributary slot, the method further includes: sending, by the first node in the second tributary slot, first migration information to a second node, where the first migration information is used to request to migrate the first low-order ODU service from the first tributary slot to the second tributary slot; receiving, by the first node, second migration information that is sent by the second node in the second tributary slot according to the first migration information, where the second migration information is used to indicate that it is agreed to migrate the first low-order ODU service from the first tributary slot to the second tributary slot; and sending, by the first node in the second tributary slot, third migration information to the second node according to the second migration information, where the third migration information is used to indicate an operation of migrating the first low-order ODU service from the first tributary slot to the second tributary slot is to be executed; and the migrating, by the first node, a first low-order ODU service in the first tributary slot from the first tributary slot to the second tributary slot includes: migrating, by the first node after a first multi-frame, the first low-order ODU service from the first tributary slot to the second tributary slot, where the first multi-frame is an $x^{th}$ multi-frame after a multi-frame used to carry the third migration information, and x is a positive integer greater than 1.

With reference to the second possible implementation manner of the first aspect, in a third possible implementation manner, the method further includes: receiving, by the first node, fourth migration information that is sent by the second node in the second tributary slot, where the fourth migration information is used to request to migrate a second low-order ODU service from the first tributary slot to the second tributary slot; sending, by the first node, fifth migration information to the second node according to the fourth migration information, where the fifth migration information is used to indicate that it is agreed to migrate the second low-order ODU service from the first tributary slot to the second tributary slot; receiving, by the first node, sixth migration information that is sent by the second node in the second tributary slot according to the fifth migration information, where the sixth migration information is used to indicate that an operation of migrating the second low-order ODU service from the first tributary slot to the second tributary slot is to be executed; and acquiring, by the first node after a second multi-frame, the second low-order ODU service from the second tributary slot, where the second multi-frame is an $x^{th}$ multi-frame after a multi-frame used to carry the sixth migration information.

With reference to the second possible implementation manner or the third possible implementation manner of the first aspect, in a fourth possible implementation manner, the multi-frame is a t1-optical channel payload unit-Cn multi-frame that is formed by t1 optical channel payload unit-Cn signal frames; or, the multi-frame is a t2-optical channel payload unit-Cn multi-frame that is formed by t2 optical channel payload unit-Cn signal frames, where t1 is a quantity of tributary slots included in each optical channel payload lane in the optical channel payload unit-Cn signal, t2 is a least common multiple of t1 and 256, and both t1 and t2 are positive integers.

With reference to the first aspect or any implementation manner of the first possible implementation manner to the fourth possible implementation manner of the first aspect, in a fifth possible implementation manner, the migrating, by the first node, a first low-order ODU service from the first tributary slot to the second tributary slot includes: switching, by the first node by using a Generic Mapping Procedure GMP, the first low-order ODU service from being mapped to the first tributary slot in a first optical channel data tributary unit-Cn.M to being mapped to the second tributary slot in a second optical channel data tributary unit-Cn.M, where the first optical channel data tributary unit-Cn.M includes M tributary slots in an OPUCn multi-frame, the second optical channel data tributary unit-Cn.M includes M tributary slots in the OPUCn multi-frame, and M is a positive integer.

With reference to the first possible implementation manner of the first aspect, in a sixth possible implementation manner, after the migrating, by the first node, the first low-order ODU service from the first tributary slot to the second tributary slot, the method further includes: updating, by the first node, the payload structure identifier.

According to a second aspect, a data migration method is provided, including: receiving, by a second node, first migration information sent by a first node in a second tributary slot, where the first migration information is used to request to migrate a first low-order ODU service from a first tributary slot to the second tributary slot, and the second tributary slot is an idle tributary slot; sending, by the second node in the second tributary slot, second migration information to the first node according to the first migration information, where the second migration information is used to indicate that it is agreed to migrate the first low-order ODU service from the first tributary slot to the second tributary slot; receiving, by the second node, third migration information that is sent by the first node in the second tributary slot according to the second migration information, where the third migration information is used to indicate that an operation of migrating the first low-order ODU service from the first tributary slot to the second tributary slot is to be executed; and acquiring, by the second node, the first low-order ODU service from the second tributary slot according to the third migration information.

With reference to the second aspect, in a first possible implementation manner, the acquiring, by the second node, the first low-order ODU service from the second tributary slot according to the third migration information includes:
acquiring, by the second node after a first multi-frame, the first low-order optical channel data unit service from the second tributary slot, where the first multi-frame is an $x^{th}$ multi-frame after a multi-frame used to carry the third migration information, and x is a positive integer greater than 1.

According to a third aspect, a communications node is provided, including: a determining unit, configured to determine, in an OPUCn signal, a second tributary slot corresponding to a first tributary slot, where the second tributary slot is an idle tributary slot; and a migrating unit, configured to migrate a first low-order ODU service from the first tributary slot to the second tributary slot.

With reference to the third aspect, in a first possible implementation manner, the determining unit is specifically configured to: determine idle tributary slots in the OPUCn signal according to a payload structure identifier of the OPUCn signal; and select the second tributary slot from the idle tributary slots.

With reference to the third aspect or the first possible implementation manner of the third aspect, in a second possible implementation manner, the communications node further includes a sending unit and a receiving unit, where
the sending unit is configured to: before the migrating unit migrates the first low-order ODU service from the first tributary slot to the second tributary slot, send, in the second tributary slot, first migration information to a second node, where the first migration information is used to request to migrate the first low-order ODU service from the first tributary slot to the second tributary slot; the receiving unit is configured to receive second migration information that is sent by the second node in the second tributary slot according to the first migration information, where the second migration information is used to indicate that it is agreed to migrate the first low-order ODU service from the first tributary slot to the second tributary slot; the sending unit is further configured to send, in the second tributary slot, third migration information to the second node according to the second migration information, where the third migration information is used to indicate that an operation of migrating the first low-order ODU service from the first tributary slot to the second tributary slot is to be executed; and the migrating unit is specifically configured to migrate, after a first multi-frame, the first low-order ODU service from the first tributary slot to the second tributary slot, where the first multi-frame is an $x^{th}$ multi-frame after a multi-frame used to carry the third migration information, and x is a positive integer greater than 1.

With reference to the second possible implementation manner of the third aspect, in a third possible implementation manner, the receiving unit is further configured to receive fourth migration information that is sent by the second node in the second tributary slot, where the fourth migration information is used to request to migrate a second low-order ODU service from the first tributary slot to the second tributary slot; the sending unit is further configured to send fifth migration information to the second node according to the fourth migration information, where the fifth migration information is used to indicate that it is agreed to migrate the second low-order ODU service from the first tributary slot to the second tributary slot; the receiving unit is further configured to receive sixth migration information that is sent by the second node in the second tributary slot according to the fifth migration information, where the sixth migration information is used to indicate that an operation of migrating the second low-order ODU service from the first tributary slot to the second tributary slot is to be executed; and the receiving unit is further configured to receive, after a second multi-frame, the second low-order ODU service from the second tributary slot, where the second multi-frame is an $x^{th}$ multi-frame after a multi-frame used to carry the sixth migration information.

With reference to the third aspect or any implementation manner of the first possible implementation manner to the third possible implementation manner of the third aspect, in a fourth possible implementation manner, the migrating unit is specifically configured to switch, by using a Generic Mapping Procedure, the first low-order ODU service from being mapped to the first tributary slot in a first optical channel data tributary unit-Cn.M to being mapped to the second tributary slot in a second optical channel data tributary unit-Cn.M, where the first optical channel data tributary unit-Cn.M includes M tributary slots in an OPUCn multi-frame, the second optical channel data tributary unit-Cn.M includes M tributary slots in the OPUCn multi-frame, and M is a positive integer.

With reference to the first possible implementation manner of the third aspect, in a fifth possible implementation manner, the communications node further includes: an updating unit, configured to update the payload structure identifier after the migrating unit migrates the first low-order ODU service from the first tributary slot to the second tributary slot.

According to a fourth aspect, a communications node is provided, including: a receiving unit, configured to receive first migration information sent by a first node in a second tributary slot, where the first migration information is used to request to migrate a first low-order ODU service from a first tributary slot to the second tributary slot, and the second tributary slot is an idle tributary slot; a generating unit, configured to generate second migration information according to the first migration information, where the second migration information is used to indicate that it is agreed to migrate the first low-order ODU service from the first tributary slot to the second tributary slot; and a sending unit, configured to send, in the second tributary slot, the second migration information to the first node, where the receiving unit is further configured to receive third migration information that is sent by the first node in the second tributary slot according to the second migration information, where the third migration information is used to indicate that an operation of migrating the first low-order ODU service from the first tributary slot to the second tributary slot is to be executed; and the receiving unit is further configured to receive the first low-order ODU service from the second tributary slot according to the third migration information.

With reference to the fourth aspect, in a first possible implementation manner, the receiving unit is specifically configured to receive, after a first multi-frame, the first low-order ODU service from the second tributary slot, where the first multi-frame is an $x^{th}$ multi-frame after a multi-frame used to carry the third migration information, and x is a positive integer greater than 1.

In the embodiments of the present invention, by migrating, in an OPUCn signal, a first low-order ODU service of a first tributary slot to an idle second tributary slot, the existence of tributary slot fragments can be avoided, thereby improving utilization of network bandwidth resources.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3a is a partial schematic diagram of a tributary slot division manner of an OPUCn signal according to an embodiment of the present invention;

FIG. 3b is a partial schematic diagram of a tributary slot division manner of an OPUCn signal according to an embodiment of the present invention;

FIG. 3c is a partial schematic diagram of a tributary slot division manner of an OPUCn signal according to an embodiment of the present invention;

FIG. 4a is a partial schematic diagram of another tributary slot division manner of an OPUCn signal according to an embodiment of the present invention;

FIG. 4b is a partial schematic diagram of another tributary slot division manner of an OPUCn signal according to an embodiment of the present invention;

FIG. 4c is a partial schematic diagram of another tributary slot division manner of an OPUCn signal according to an embodiment of the present invention;

FIG. 4d is a partial schematic diagram of another tributary slot division manner of an OPUCn signal according to an embodiment of the present invention;

FIG. 4e is a partial schematic diagram of another tributary slot division manner of an OPUCn signal according to an embodiment of the present invention;

FIG. 4f is a partial schematic diagram of another tributary slot division manner of an OPUCn signal according to an embodiment of the present invention;

FIG. 7 is a schematic diagram of a byte structure of a PSI according to an embodiment of the present invention;

FIG. 8 is a schematic diagram of migration protocol overheads according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
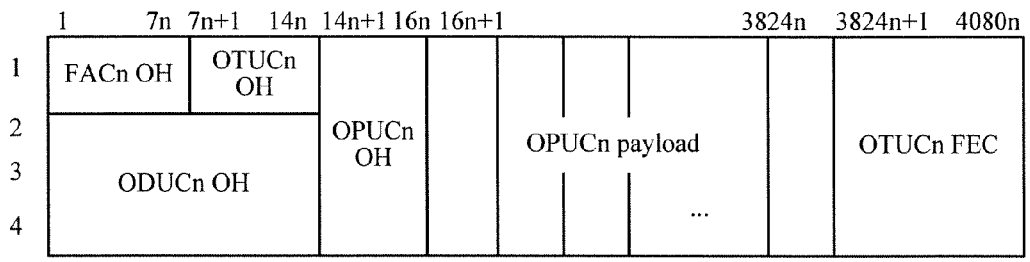
FIG. 1 is a schematic diagram of a frame structure of an OTUCn signal according to an embodiment of the present invention.

FIG. 1 is a schematic diagram of a frame structure of an OTUCn signal according to an embodiment of the present invention.

As shown in FIG. 1, a frame structure of an OTUCn signal has 4 rows and 4080×n columns, where columns 1 to 7n in row 1 are a frame header indication overhead, columns 7n+1 to 14n in row 1 are an OTUCn overhead (OH) area, columns 1 to 14n in rows 2 to 4 are an ODUCn overhead area, columns 14n+1 to 16n in rows 1 to 4 are an OPUCn overhead area, columns 16n+1 to 3824n in rows 1 to 4 are an OPUCn payload area, and columns 3824n+1 to 4080n in rows 1 to 4 are a forward error correction (FEC) check area of the OTUCn signal.

A rate of the OTUCn is n multiples of a reference rate, where n is variable, and the reference rate may be any rate. In this embodiment of the present invention, the reference rate is preferably a rate at a rate level of 100 Gbit/s. For the reference rate that is preferably the rate at the rate level of 100 Gbit/s, this embodiment of the present invention provides two solutions for rates of the OTUCn, ODUCn and OPUCn:

Solution (1)

| Signal type | Rate | Rate tolerance |
|---|---|---|
| OTUCn | n × 112304707.965 kbit/s (n × 255/226 × 99532800 kbit/s) | ±20 ppm |
| ODUCn | n × 105258138.053 kbit/s (n × 239/226 × 99532800 kbit/s) | ±20 ppm |
| OPUCn payload | n × 104817727.434 kbit/s (n × 238/226 × 99532800 kbit/s) | ±20 ppm |

Solution (2)

| Signal type | Rate | Rate tolerance |
|---|---|---|
| OTUCn | n × 112803840.000 kbits (n × 255/225 × 99532800 kbit/s) | ±20 ppm |
| ODUCn | n × 105725952.000 kbits (n × 239/225 × 99532800 kbit/s) | ±20 ppm |
| OPUCn payload | n × 105 283 584 kbits (n × 238/225 × 99532800 kbit/s) | ±20 ppm |

The OTUCn signal may be split into n optical channel transport lane (OTL) signals in a byte interleaving manner, and the signals are sequentially numbered as OTLCn.n #1, OTLCn.n #2, . . . , OTLCn.n #n, where n is a positive integer greater than 1. The n OTLCn.n signals may be transmitted by using multiple channels of multi-subcarriers or multiple channels of optical signals. Specifically, the first byte of the first row in the OTUCn signal is allocated to OTLCn.n #1, the second byte in the first row is allocated to OTLCn.n #2, . . . , the $n^{th}$ byte is allocated to OTLCn.n #n, and then the $(n+1)^{th}$ byte is allocated to OTLCn.n #1. The rest may be deduced by analogy, and the OTUCn signal is split into n OTL signals.

Figure 2:
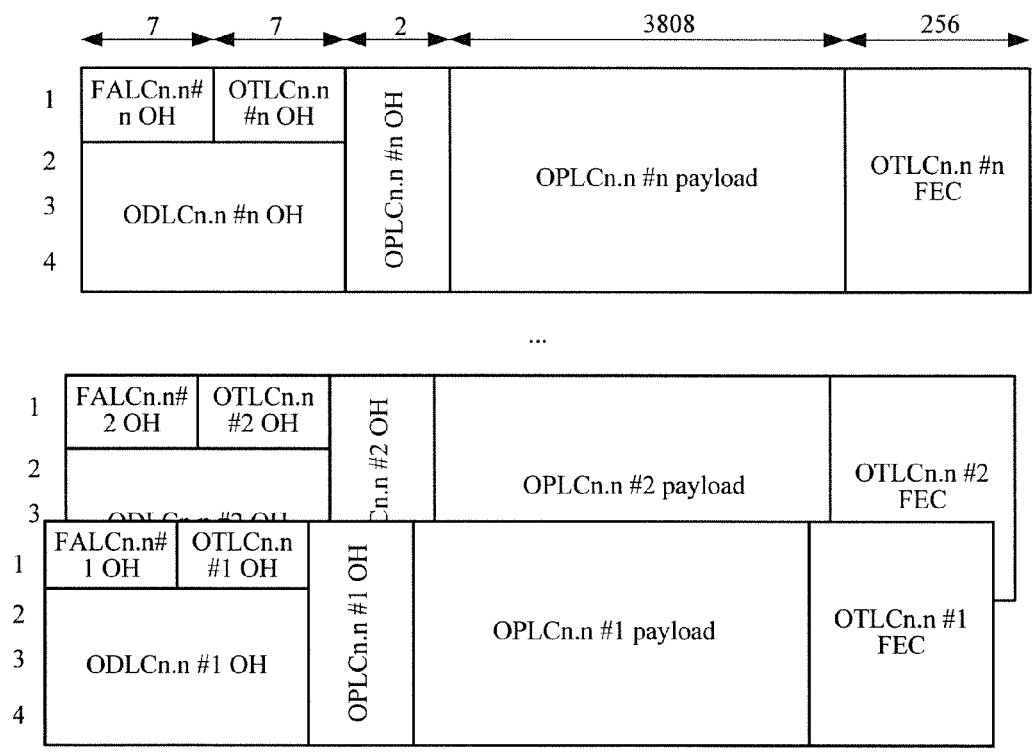
FIG. 2 is a schematic diagram of frame structures of n OTLCn.n signals according to an embodiment of the present invention.

Correspondingly, the ODUCn may also be split into n optical channel data lane (ODL) signals in a byte interleaving manner, that is, n ODLCn.n signals exist, which may be sequentially numbered as ODLCn.n #1, ODLCn.n #2, . . . , ODLCn.n #n; and the OPUCn may also be split into n optical channel payload lane (OPL) signals in a byte interleaving manner, that is, n OPLCn.n signals exist, which may be sequentially numbered as OPLCn.n #1, OPLCn.n #2, . . . , OPLCn.n #n. FIG. 2 is a schematic diagram of frame structures of n OTLCn.n signals according to an embodiment of the present invention.

The OPUCn signal may be split into 10n 10 G tributary slots, where the tributary slots may be sequentially numbered 1 to 10n. Each OPL signal may include 10 tributary slots. OPLCn.n #1 may include tributary slots 1 to 10, and OPLCn.n #2 may include tributary slots 11 to 20; the rest may be deduced by analogy, and OPLCn.n #n may include tributary slots 10n−9 to 10n.

There may be two tributary slot division manners for the OPUCn signal, that is, a tributary slot division manner in a case in which there are padding columns, and a tributary slot division manner in a case in which there is no padding column.

FIG. 3a to FIG. 3c are each a partial schematic diagram of a tributary slot division manner of an OPUCn signal according to an embodiment of the present invention. FIG. 3a to FIG. 3c may form a complete schematic diagram to show this tributary slot division manner.

FIG. 3a to FIG. 3c show a tributary slot division manner in a case in which there are padding columns. As shown in FIG. 3a to FIG. 3c, tributary slot division is performed in a column interleaving manner on a multi-frame that includes 10 OPUCn frames. 10n tributary slots are located in columns 16n+1 to 3816n, and padding columns are located in columns 3816n+1 to 3824n. Each tributary slot occupies 40 rows and 380 columns, and from the perspective of a quantity of columns, each tributary slot occupies 380 columns. As can be seen from FIG. 2, a payload area of a single OPL signal occupies 3808 columns, that is, a proportion of each tributary slot to the payload area of the single OPLCn.n is 380/3808=9.979%. Tributary slot overheads are located in columns 14n+1 to 16n, and tributary slot overheads corresponding to each tributary slot appear at intervals of 10 OPUCn frames, and are indicated by using 5 to 8 bits of an OPU multi-frame identifier (OMFI).

The foregoing tributary slot division process shown in FIG. 3a to FIG. 3c may be construed as follows: an OPUCn signal is considered as an entity, and is split into 10n tributary slots in a byte interleaving manner; or may be construed as follows: first, an OPUCn signal is split into n OPL signals in a byte interleaving manner, as shown in the division manner of n OPL signals in FIG. 2, and then, each OPL signal is split into 10 tributary slots in a byte interleaving manner, to obtain 10n tributary slots. As shown in FIG. 3a to FIG. 3c, in a case in which there are padding columns, the division manner of 10n tributary slots may be considered as a column interleaving division manner. Corresponding to this tributary slot division manner, rates of the OTUCn, ODUCn and OPUCn may follow the foregoing rate solution (1), and a rate corresponding to a 10 G tributary slot of the OPUCn is 10504285.839 kbit/s+100 ppm.

FIG. 4a to FIG. 4f are each a partial schematic diagram of another tributary slot division manner of an OPUCn signal according to an embodiment of the present invention. FIG. 4a to FIG. 4f may form a complete schematic diagram to show this tributary slot division manner.

FIG. 4a to FIG. 4f show a tributary slot division manner in a case in which there is no padding column. As shown in FIG. 4a to FIG. 4f, tributary slot division is performed in a byte interleaving manner on a multi-frame that includes 10 OPUCn frames. 10n tributary slots are located in columns 16n+1 to 3824n, where there is no padding column. A superrow needs to be introduced in this division manner, and division is performed by forming every 5 rows into 1 superrow, thereby implementing complete division of 10n tributary slots. The multi-frame formed by 10 OPUCn frames includes 8 superrows.

The foregoing tributary slot division process shown in FIG. 4a to FIG. 4f may be construed as follows: an OPUCn signal is considered as an entity, and is split into 10n tributary slots in a byte interleaving manner; or may be construed as follows: first, an OPUCn signal is split into n OPL signals in a byte interleaving manner, as shown in the division manner of n OPL signals in FIG. 2, and then, each OPL signal is split into 10 tributary slots in a byte interleaving manner, to obtain 10n tributary slots. Corresponding to this tributary slot division manner, rates of the OTUCn, ODUCn and OPUCn may follow the foregoing rate solution (2), and a rate corresponding to a 10 G tributary slot of the OPUCn is 10479823.134 kbit/s±100 ppm.

Each tributary slot occupies 40 rows and 380.8 columns (8 superrows and 1904 columns). Specifically, a payload area of a single OPL signal occupies 3808 columns, and a single OPL signal may be split into 10 tributary slots. Therefore, theoretically, each tributary slot occupies 380.8 columns, that is, each tributary slot occupies 380.8/3808=10% of the payload area of a single OPL signal.

Tributary slot overheads are located in columns 14n+1 to 16n, and tributary slot overheads corresponding to each tributary slot appear at intervals of 10 OPUCn frames, and are indicated by using 5 to 8 bits of an OMFI.

The OPUCn signal implements hybrid carrying for multiple low-order services by using 10n 10 G tributary slots. Because low-order services occupy tributary slots of the OPUCn signal randomly, tributary slot fragments may appear in the OPUCn signal. Alternatively, after some low-order services are canceled, tributary slot fragments may also appear in the OPUCn signal. Because the tributary slot fragments reduce utilization of network bandwidth resources, the tributary slot fragments need to be eliminated, and therefore, services in the tributary slots need to be migrated. The following describes in detail a data migration method and a node on an OTN according to the embodiments of the present invention.

Figure 5:
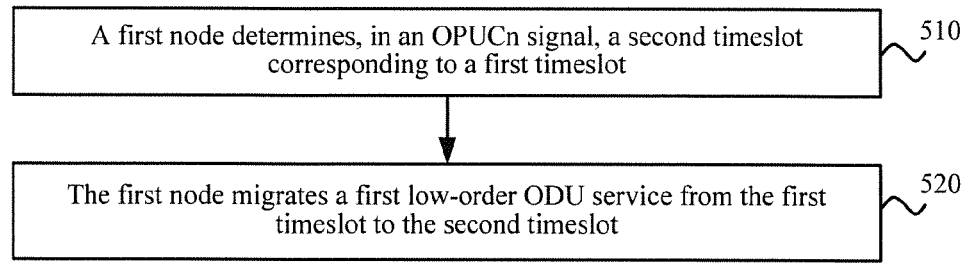
FIG. 5 is a schematic flowchart of a data migration method according to an embodiment of the present invention.

FIG. 5 is a schematic flowchart of a data migration method according to an embodiment of the present invention. The method of FIG. 5 is performed by a node on an OTN.

510. A first node determines, in an OPUCn signal, a second tributary slot corresponding to a first tributary slot, where the second tributary slot is an idle tributary slot.

520. The first node migrates a first low-order ODU service from the first tributary slot to the second tributary slot.

In this embodiment of the present invention, the first node may be a source node on the OTN, or may be a sink node. The low-order ODU service may include ODU0, ODU1, ODU2, ODU2e, ODU3, ODU4 or ODUflex.

Before step 510, the first node may determine, according to an actual requirement, whether the first low-order ODU service in the first tributary slot needs to be migrated. For example, because some low-order ODU services in the OPL signal are canceled, only some scattered tributary slots in the OPL signal carry low-order ODU services. In a case in which these low-order ODU services need to be managed in a centralized manner, or in a case in which resources occupied by the OPL signal need to be released, the first node may determine to migrate the low-order ODU services carried by the scattered tributary slots. The first tributary slot may be any one of these scattered tributary slots.

Before the first low-order ODU service of the first tributary slot is migrated, a destination tributary slot, that is, the second tributary slot, to which the first low-order ODU service is migrated needs to be determined. The second tributary slot should be an idle tributary slot, so as to ensure that the first low-order ODU service of the first tributary slot can be migrated to the second tributary slot. An OPL signal to which the first tributary slot belongs and an OPL signal to which the second tributary slot belongs may be the same or may be different.

After the second tributary slot is determined, the first node may migrate the first low-order ODU service of the first tributary slot to the second tributary slot, that is, the first node may transmit the first low-order ODU service by using the second tributary slot, so that the first tributary slot no longer carries valid data. In this way, by migrating the first low-order ODU service of the first tributary slot to the second tributary slot, the existence of tributary slot fragments is avoided effectively, thereby improving utilization of network bandwidth resources. In addition, centralized management can further be performed on low-order ODU services.

For example, the first tributary slot and the second tributary slot may belong to a same OPL signal, for example, in the OPL signal, the second tributary slot may be adjacent to a tributary slot carrying another low-order ODU service. In this way, by migrating the first low-order ODU service of the first tributary slot to the second tributary slot, the low-order ODU services may be centralized in successive tributary slots. If tributary slots occupied by the low-order ODU services are scattered, it may increase the complexity of managing these scattered tributary slots, and may also cause scattered idle tributary slots, which makes it inconvenient to use the idle tributary slots. Therefore, in this embodiment of the present invention, by migrating a low-order ODU service, it not only can reduce the complexity of managing tributary slots, but also can centralize idle tributary slots, so that the idle tributary slots can be allocated to other low-order ODU services easily, thereby improving utilization of network bandwidth resources.

For another example, due to the existence of tributary slot fragments, an OPL signal cannot be deleted according to requirements of actually carried low-order ODU services, that is, a corresponding OTL signal cannot be deleted, and therefore a line interface rate cannot be adjusted dynamically. In this embodiment of the present invention, the first tributary slot and the second tributary slot may separately belong to different OPL signals, and therefore, by migrating the first low-order ODU service of the first tributary slot to the second tributary slot to centralize low-order ODU services on the same OPL signal, preparation can be made for subsequent deletion of the OPL signal to which the first tributary slot belongs, thereby improving utilization of network bandwidth resources, and also facilitating centralized management on the low-order ODU services.

Therefore, in this embodiment of the present invention, by migrating, in an OPUCn signal, a first low-order ODU service of a first tributary slot to an idle second tributary slot, the existence of tributary slot fragments can be avoided, thereby improving utilization of network bandwidth resources.

Currently, protection switching of two OTUk signals is also often used to ensure transmission of a client signal. In a protection switching process, because of a delay difference, usually, accurate synchronization of the two OTUk signals cannot be implemented, which may cause damage to a service. However, in this embodiment of the present invention, because migration of a low-order ODU service is performed between tributary slots in a same OPUCn signal, synchronism of OPL signals can be ensured, and therefore, lossless migration of the low-order ODU service can be implemented.

It should be understood that, in this embodiment of the present invention, the "low-order ODU service" may be construed as a "low-order ODU service data stream" or a "low-order ODU service signal".

Optionally, as an embodiment, in step 510, the first node may determine idle tributary slots in the OPUCn signal according to a payload structure identifier (Payload Structure Identifier, PSI) of the OPUCn signal. The first node may select the second tributary slot from the idle tributary slots.

Figure 6:
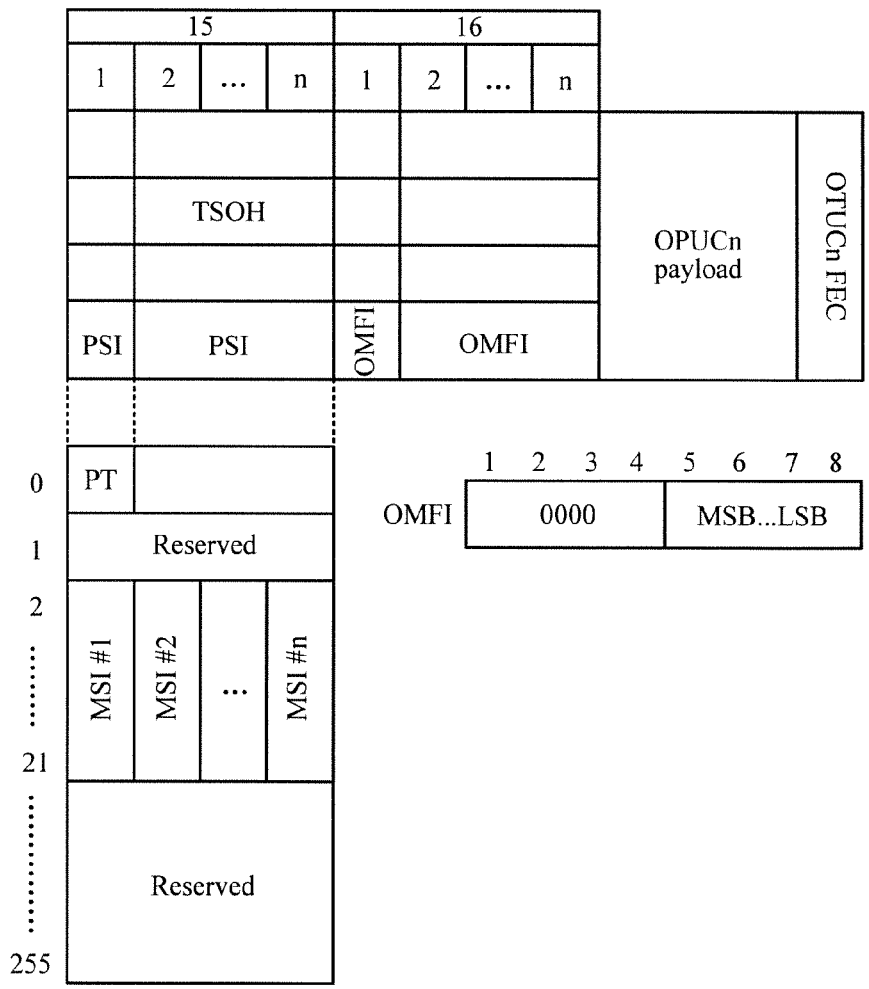
FIG. 6 is a schematic diagram of PSI overheads according to an embodiment of the present invention.

Specifically, the first node may determine a current tributary slot occupation status in the OPUCn signal according to a PSI of a 256-multi-frame of the OPUCn signal, thereby determining idle tributary slots. FIG. 6 is a schematic diagram of PSI overheads according to an embodiment of the present invention. As shown in FIG. 6, the PSI is located at row 4 and columns 14n+1 to 15n, which separately indicate occupation statuses of tributary slots in n OPL signals. PSI[2] to PSI[21] of the $(14n+1)^{th}$ column indicate tributary slots 1 to 10, PSI[2] to PSI[21] of the $(14n+2)^{th}$ column indicate tributary slots 11 to 20, and so on, . . . , and PSI[2] to PSI[21] of the $(15n)^{th}$ column indicate tributary slots 10n−9 to 10n. For other parts shown in FIG. 6, such as an OPUCn payload, an OTUCn FEC, a tributary slot overhead (TSOH), a most significant bit (MSB), a last significant bit (LSB) and a multiplex structure identifier (MSI), reference may be made to meanings in the prior art, and details are not described herein again.

FIG. 7 is a schematic diagram of a byte structure of a PSI according to an embodiment of the present invention. As shown in FIG. 7, indication for each tributary slot occupies 2 bytes, where the first bit of the first byte indicates whether a corresponding tributary slot is occupied (Occupation), and if the corresponding tributary slot is occupied, an assigned value is 1; otherwise, an assigned value is 0. A total of 15 bits, that is, the $2^{nd}$ to $8^{th}$ bits of the first byte and the $1^{st}$ to $8^{th}$ bits of the second byte, denote a tributary port number (Tributary Port) allocated to the corresponding tributary slot, that is, an indicator of a low-order ODU service carried in the tributary slot. When the OPUCn signal carries low-order ODU services, a payload type (PT) is assigned a value of 0x22, and is located at row 4 and column 14n+1. In FIG. 7, i=1 to 10, denoting PSI[2] to PSI[21]; and j=1 to n, denoting the $1^{st}$ to $n^{th}$ OPLs.

After the second tributary slot is determined, the first node may migrate the first low-order ODU service from the first tributary slot to the second tributary slot. Migration processing needs to follow a given rule, and therefore, a migration protocol is defined. In the migration protocol, the following fields are defined: MCTRL (Moving Control), MTSID (Moving Tributary Slot Identifier), RESP and CRC. These fields are set in columns 14n+1 to 15n in rows 1 to 3, and occupy 3 bytes in each OPL signal. FIG. 8 is a schematic diagram of migration protocol overheads according to an embodiment of the present invention. As shown in FIG. 8, these fields occupy the $15^{th}$ column of the $1^{st}$ to $3^{rd}$ rows of each OPL signal.

The MCTRL is a control signaling indicator, and occupies 2 bits. For example, when a value of the MCTRL is 00, it may denote idle (IDLE); when the value is 01, it may denote a migration request indication (MOVE_REQ); when the value is 10, it may denote a migration implementation indication (MOVE_DO), that is, denote a migration operation to be executed; and when the value is 11, it denotes reserved.

The MTSID is an identifier of a tributary slot in which a low-order service is to be migrated; the MTSID occupies 13 bits, and may denote tributary slots 1 to 10n. 13 bits may denote a range of 0 to 8191. The field may be further expanded according to a requirement.

The RESP is a response state indicator, and occupies 1 bit. For example, when a value of the RESP is 1, it may denote that migration is approved (ACK); and when the value is 0, it may denote that migration is rejected (NACK).

The CRC is check information, and occupies 8 bits.

Based on the migration protocol, the first node may complete unidirectional migration processing, or the first node and the second node jointly complete bidirectional migration processing. The unidirectional migration processing refers to migration processing executed by a source node. The bidirectional migration processing refers to migration processing executed by both a source node and a sink node. In a case of unidirectional migration, the first node may be a source node, and the second node may be a sink node. In a case of bidirectional migration, one of the first node and the second node may be a source node, and the other one may be a sink node.

Optionally, as another embodiment, before step 520, the first node may send, in the second tributary slot, first migration information to the second node, where the first migration information is used to request to migrate the first low-order ODU service from the first tributary slot to the destination tributary slot. The first node may receive second migration information that is sent by the second node in the second tributary slot according to the first migration information, where the second migration information is used to indicate that it is agreed to migrate the first low-order ODU service from the first tributary slot to the second tributary slot. The first node may send, in the second tributary slot, third migration information to the second node according to the second migration information, where the third migration information is used to indicate that an operation of migrating the first low-order ODU service from the first tributary slot to the second tributary slot is to be executed. The first node may migrate, after a first multi-frame, the first low-order ODU service from the first tributary slot to the second tributary slot, where the first multi-frame is an $x^{th}$ multi-frame after a multi-frame used to carry the third migration information, and x is a positive integer greater than 1.

The first migration information, the second migration information and the third migration information may all include fields defined in the migration protocol. For different information, values of the foregoing fields are different. For example, the first migration information may be expressed as {MOVE_REQ, first tributary slot identifier, NACK}. The second migration information may be expressed as {IDLE, 0, ACK}. The third migration information may be expressed as {MOVE_DO, first tributary slot identifier, ACK}.

The first node may migrate, after a first multi-frame, the first low-order ODU service from the first tributary slot to the second tributary slot. The first multi-frame may be an $x^{th}$ multi-frame after a multi-frame used to carry the third migration information.

The second node may acquire, after the first multi-frame, data of the first low-order ODU service from the second tributary slot. In this way, the third migration information is used to notify the second nod of a migration operation to be executed, and the first low-order ODU service is migrated, after the $x^{th}$ multi-frame following a multi-frame that carries the third migration information, to the second tributary slot, thereby ensuring synchronized operations of the first node and the second node, so that the second node can correctly receive, in the second tributary slot, the first low-order ODU service. A value of x may be preset, and the first node and the second node may separately store the value locally.

As described above, in this embodiment of the present invention, not only unidirectional migration but also bidirectional migration can be implemented. That is, low-order ODU service migration is performed at the same time in a receiving direction and a sending direction. In this case, the first node may be a source node, and the second node may be a sink node. Alternatively, the first node may be a sink node, and the second node may be a source node.

It can be seen that, in this embodiment, by means of negotiation between the first node and the second node, time for executing the migration operation is determined, so that consistency of operations on both sides can be ensured, thereby ensuring losslessness of the migrated low-order ODU service.

Optionally, as another embodiment, the multi-frame may be a t1-OPUCn multi-frame that is formed by t1 OPUCn signal frames; or, the multi-frame may be a t2-OPUCn multi-frame that is formed by t2 OPUCn signal frames, where t1 is a quantity of tributary slots included in each OPL in the OPUCn, t2 is a least common multiple of t1 and 256, and both t1 and t2 are positive integers.

For example, the OPUCn signal may be split into 10n tributary slots. Generally, to make space occupied by each tributary slot the same as space of a payload area of a single OPL signal, division may be performed by using a 10-OPUCn multi-frame as a unit. Therefore, t1 may be 10, and the multi-frame herein may refer to a 10-OPUCn multi-frame, that is, a 10-frame multi-frame of OPUCn, where 10 OPUCn frames form a 10-frame multi-frame. In addition, to be compatible with a 256-multi-frame of a conventional OTN network, the multi-frame may be a 2560-OPUCn multi-frame, that is, t2 may be 2560, that is, t2 is a least common multiple of 10 and 256. The 2560-OPUCn multi-frame may be formed by 2560 OPUCn signal frames.

In this embodiment of the present invention, the migration operation may be executed by using a multi-frame as a unit, for example, the first node migrates, after the first multi-frame, the first low-order ODU service from the first tributary slot to the second tributary slot.

Optionally, as another embodiment, the first node may receive fourth migration information that is sent by the second node in the second tributary slot, where the fourth migration information is used to request to migrate a second low-order ODU service from the first tributary slot to the second tributary slot. The first node may send fifth migration information to the second node according to the fourth migration information, where the fifth migration information is used to indicate that it is agreed to migrate the second low-order ODU service from the first tributary slot to the second tributary slot. The first node may receive sixth migration information that is sent by the second node in the second tributary slot according to the fifth migration information, where the sixth migration information is used to indicate that an operation of migrating the second low-order ODU service from the first tributary slot to the second tributary slot is to be executed. The first node may receive, after a second multi-frame, the second low-order ODU service from the second tributary slot, where the second multi-frame may be an $x^{th}$ multi-frame after a multi-frame used to carry the sixth migration information.

For bidirectional migration, while the first node initiates a migration request, the second node may also initiate a migration request. After receiving the migration request from the peer node, the two nodes may each send a migration response to the peer node. After receiving the migration response from the peer node, the two nodes may each send a migration implementation indication to the peer node. After the $x^{th}$ multi-frame following a multi-frame that carries the migration implementation indication, the first node may migrate the first low-order ODU service of the first tributary slot to the second tributary slot, and the second node may migrate the second low-order ODU service of the first tributary slot to the second tributary slot. Therefore, the first node may acquire, from the second tributary slot, valid data of the second low-order ODU service, and the second node may acquire, from the second tributary slot, valid data of the first low-order ODU service.

The fourth migration information, the fifth migration information and the sixth migration information may be separately used to implement functions of a migration request, a migration response and a migration implementation indication. The fourth migration information, the fifth migration information and the sixth migration information may all include fields defined in the migration protocol. For different information, values of the foregoing fields are different. For example, the fourth migration information may be expressed as {MOVE_REQ, first tributary slot identifier, NACK}. The fifth migration information may be expressed as {MOVE_REQ, first tributary slot identifier, ACK}. The sixth migration information may be expressed as {MOVE_DO, first tributary slot identifier, ACK}.

The multi-frame may be a t1-OPUCn multi-frame that is formed by t1 OPUCn signal frames; or, the multi-frame may be a t2-OPUCn multi-frame that is formed by t2 OPUCn signal frames, where t1 is a quantity of tributary slots included in each OPL in the OPUCn, t2 is a least common multiple of t1 and 256, and both t1 and t2 are positive integers. For example, the OPUCn signal may be split into 10n tributary slots. Generally, to make space occupied by each tributary slot the same as space of a payload area of a single OPL signal, division may be performed by using a 10-OPUCn multi-frame as a unit. Therefore, the multi-frame herein may refer to a 10-OPUCn multi-frame, that is, a 10-frame multi-frame of OPUCn, where 10 OPUCn frames form a 10-frame multi-frame. In addition, to be compatible with a 256-multi-frame of a conventional OTN network, the foregoing multi-frame may be a 2560-OPUCn multi-frame, that is, t2 may be 2560, that is, t2 is a least common multiple of 10 and 256. The 2560-OPUCn multi-frame may be formed by 2560 OPUCn signal frames.

The second low-order ODU service and the first low-order ODU service may be of a same service type, or may be of different service types. For example, the first low-order ODU service and the second low-order ODU service may be ODUflex, or the first low-order ODU service is ODUflex, and the second low-order ODU service is ODU3.

It can be seen that, in this embodiment, by means of negotiation between the first node and the second node, time for executing the migration operation is determined, so that consistency of operations on both sides can be ensured, thereby ensuring losslessness of the migrated low-order ODU service.

Optionally, as another embodiment, in step 520, the first node may switch, by using a Generic Mapping Procedure (GMP), the first low-order ODU service from being mapped to a first optical channel data tributary unit-Cn.M (ODTUCn.M) to being mapped to a second ODTUCn.M, where the first ODTUCn.M includes M tributary slots in an OPUCn multi-frame, the second ODTUCn.M includes M tributary slots in the OPUCn multi-frame, and M is a positive integer.

Figure 9:
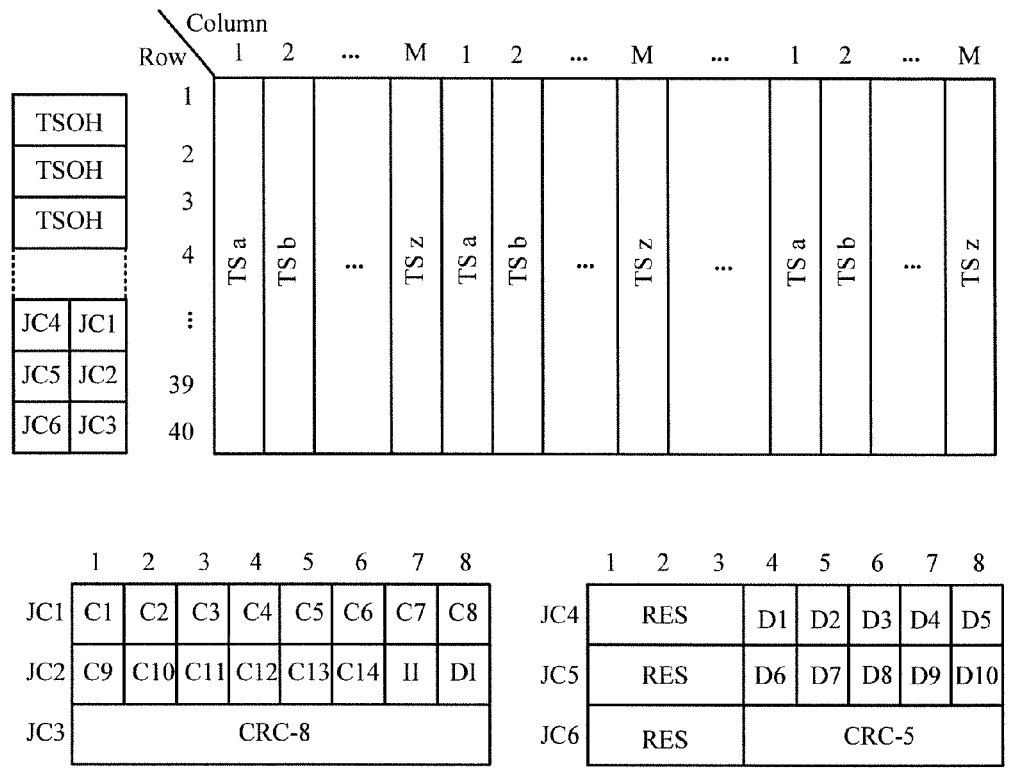
FIG. 9 is a schematic diagram of an ODTUCn.M structure and mapping overheads according to an embodiment of the present invention.

For example, ODTUCn.M may be formed by M tributary slots of a 10-OPUCn multi-frame and corresponding tributary slot overheads, where the 10-OPUCn multi-frame is formed by 10 OPUCn frames, for example, the 10 OPUCn frames herein may include the OPUCn signal. Specifically, FIG. 9 is a schematic diagram of an ODTUCn.M structure and mapping overheads according to an embodiment of the present invention, where the ODTUCn.M structure and mapping overheads are framed by 40 rows (where there are 10 OPUCn frames, and each OPUCn frame occupies 4 rows) and 380×M columns (which correspond to an OPUCn tributary slot division manner in a case in which there are padding columns, where each tributary slot includes 380 columns) and 6 bytes of tributary slot overheads (which are tributary slot overheads corresponding to one of the tributary slots). As shown in FIG. 9, when the first low-order ODU service is mapped to the second ODTUCn.M, a mapping granularity may be preferably 4×M bytes, and the mapping overheads are set in tributary slot overheads of a last tributary slot occupied by the first low-order ODU service. The mapping overheads may include Cm and $C_{8D}$ information, where Cm is data information, denoting a quantity of low-order ODU services carried in a payload area, and $C_{8D}$ is clock information, denoting clock information of the low-order ODU services carried in the payload area. CRC is check information. The mapping overheads may further include an increment indicator (II) and a decrement indicator (DI). As shown in FIG. 9, C1 to C14 are 14-bit Cm, where m=4×8×ts. D1 to D10 denote the clock information.

The first node switches, after the $x^{th}$ multi-frame following the multi-frame that carries the third migration information, the first low-order ODU service from being mapped to the first ODTUCn.M to being mapped to the second ODTUCn.M. It should be understood that, the multi-frame carrying migration information may refer to a 10-OPUCn multi-frame, or may refer to a 2560-OPUCn multi-frame, where 2560 is a least common multiple of 256 and 10, that is, the 2560-OPUCn multi-frame is formed by 2560 OPUCn frames.

ODTUCn.M is formed by M tributary slots in the 10-OPUCn multi-frame and corresponding tributary slot overheads. It can be seen that, the composition of the multi-frame used to transmit the first ODU low-order service and the composition of the multi-frame carrying the migration information may be the same as or may be different.

Optionally, as another embodiment, the first node may update the PSI.

Specifically, after executing the operation of migrating the first low-order ODU service, the first node may update the PSI of the 256-multi-frame of the OPUCn signal, that is, update the occupation statuses of the tributary slots.

For the foregoing bidirectional migration, the second node may also update the PSI of the 256-multi-frame of the OPUCn signal after executing the operation of migrating the second low-order ODU service.

Figure 10:
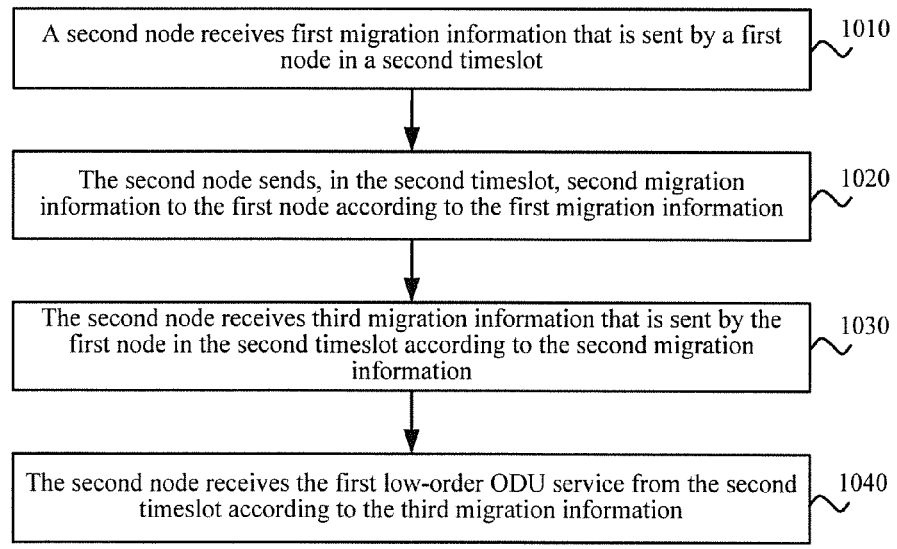
FIG. 10 is a schematic flowchart of a data migration method according to another embodiment of the present invention.

FIG. 10 is a schematic flowchart of a data migration method according to another embodiment of the present invention. The method of FIG. 10 is performed by a node on an OTN.

1010. A second node receives first migration information sent by a first node in a second tributary slot, where the first migration information is used to request to migrate a first low-order ODU service from a first tributary slot to the second tributary slot, and the second tributary slot is an idle tributary slot.

1020. The second node sends, in the second tributary slot, second migration information to the first node according to the first migration information, where the second migration information is used to indicate that it is agreed to migrate the first low-order ODU service from the first tributary slot to the second tributary slot.

1030. The second node receives third migration information that is sent by the first node in the second tributary slot according to the second migration information, where the third migration information is used to indicate that an operation of migrating the first low-order ODU service from the first tributary slot to the second tributary slot is to be executed.

1040. The second node receives the first low-order ODU service from the second tributary slot according to the third migration information.

The first node may be a source node, and the second node may be a sink node. For unidirectional migration, the source node may migrate the first low-order ODU service in the first tributary slot to the second tributary slot, and send the first low-order ODU service by using the second tributary slot. The sink node may acquire the first low-order ODU service from the second tributary slot. In this process, the source node needs to negotiate with the sink node before executing the migration operation, thereby ensuring consistency of operations of the nodes at two ends. Specifically, the second node receives a migration request of the first node, and then sends a migration response to the first node according to the migration request. After receiving the migration response, the first node sends a migration implementation indication to the second node, and migrates the first low-order ODU service from the first tributary slot to the second tributary slot. The second node may acquire the first low-order ODU service in the second tributary slot according to the migration implementation indication.

The migration request, the migration response and the migration implementation indication may be implemented by using the first migration information, the second migration information and the third migration information respectively. The first migration information, the second migration information and the third migration information may all include fields defined in the migration protocol. For different information, values of the foregoing fields are different. For example, the first migration information may be expressed as {MOVE_REQ, first tributary slot identifier, NACK}. The second migration information may be expressed as {IDLE, 0, ACK}. The third migration information may be expressed as {MOVE_DO, first tributary slot identifier, ACK}.

Optionally, as an embodiment, the second node may receive, after a first multi-frame, the first low-order ODU service from the second tributary slot, where the first multiframe is an $x^{th}$ multi-frame after a multi-frame used to carry the third migration information, and x is a positive integer greater than 1.

Specifically, the first node may migrate, after the $x^{th}$ multi-frame following a multi-frame that carries the migration implementation indication, the first low-order ODU service from the first tributary slot to the second tributary slot. The second node may acquire, after the $x^{th}$ multi-frame, the first low-order ODU service from the second tributary slot. A value of x may be preset, and the first node and the second node may separately store the value locally, thereby ensuring consistency of operations of the first node and the second node, so that the second node accurately receives the first low-order ODU service.

In this embodiment of the present invention, a second node sends, to a first node according to first migration information of the first node, second migration information used to indicate that it is agreed to execute a migration operation, so that the first node may migrate a first low-order ODU service from a first tributary slot to an idle second tributary slot, and the existence of tributary slot fragments can be avoided, thereby improving utilization of network bandwidth resources.

The following describes in detail the embodiments of the present invention with reference to specific examples. It should be noted that, these examples are only for helping a person skilled in the art better understand the embodiments of the present invention, but are not for limiting the scope of the embodiments of the present invention.

Figure 11:
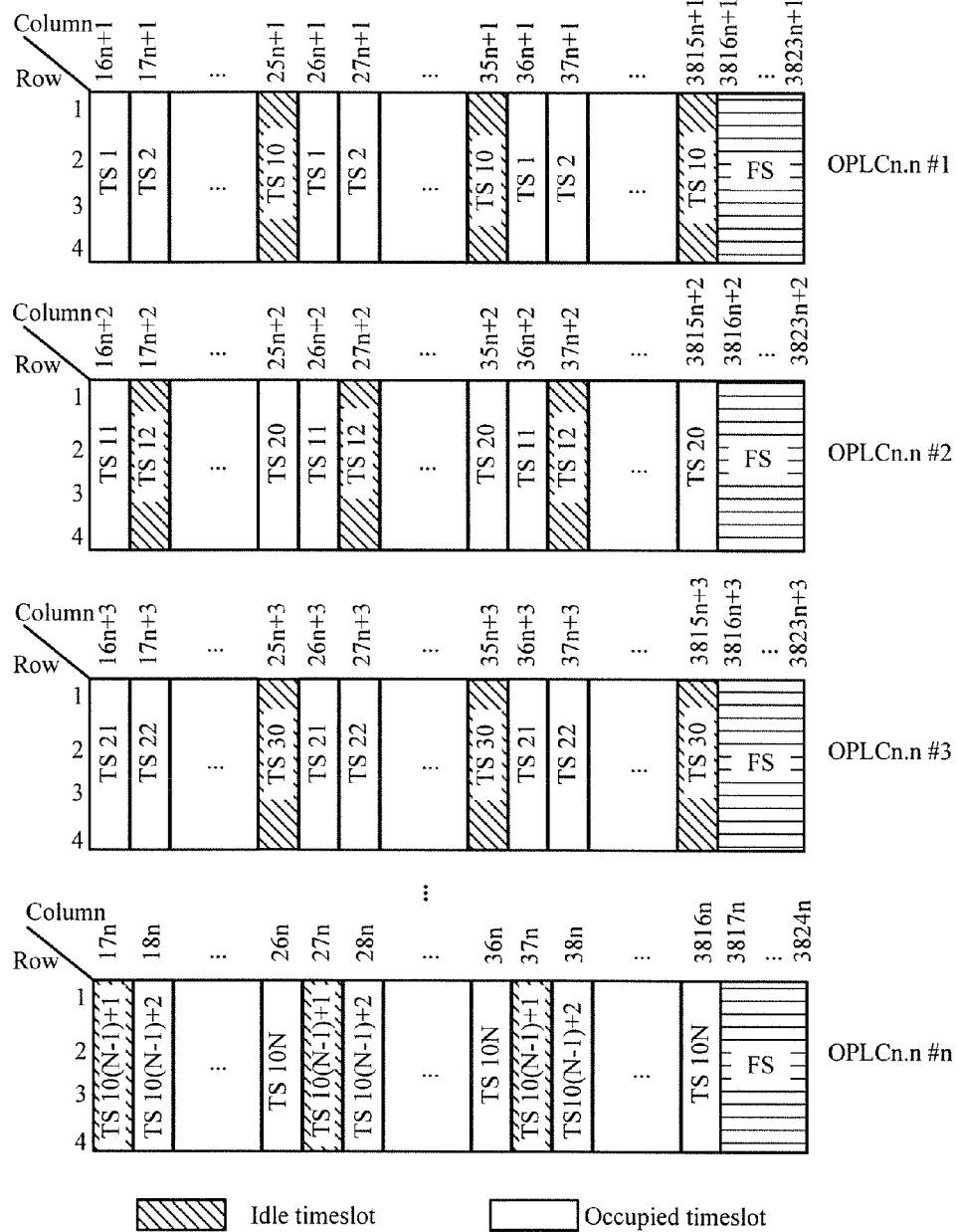
FIG. 11 is a schematic distribution diagram of low-order ODU services in an OPUCn signal according to an embodiment of the present invention.

FIG. 11 is a schematic distribution diagram of low-order ODU services in an OPUCn signal according to an embodiment of the present invention.

In FIG. 11, the following assumption is made: on OPLCn.n #3, TS 30 is an idle tributary slot, and both TS 21 and TS 22 carry low-order ODU services; and some idle tributary slots exist on other OPLs, for example, on OPLCn.n #1, TS 10 is an idle tributary slot, and on OPLCn.n #2, TS 12 is an idle tributary slot. Assuming that OPLCn.n #3 is a tributary signal that needs to be deleted, the low-order ODU service in TS 21 and the low-order ODU service in TS 22 need to be migrated. The following describes in detail a process of data migration with reference to FIG. 12 and FIG. 13.

Figure 12:
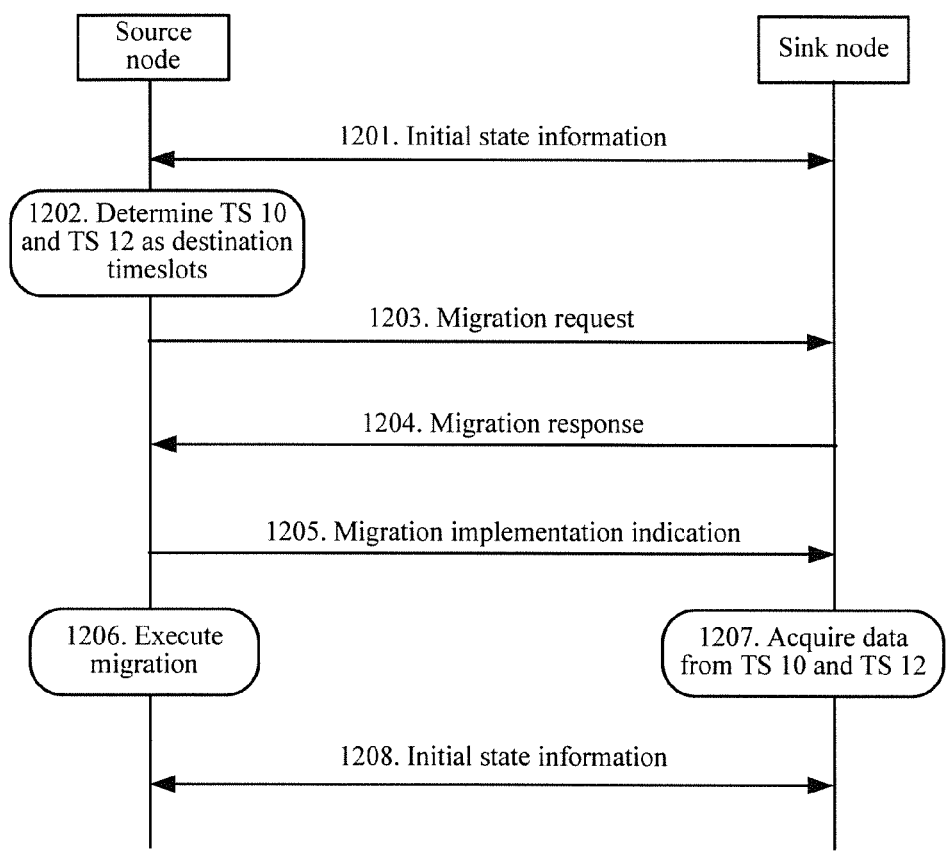
FIG. 12 is a schematic flowchart of a process of a data migration method according to an embodiment of the present invention.

FIG. 12 is a schematic flowchart of a process of a data migration method according to an embodiment of the present invention.

In FIG. 12, with reference to FIG. 11, a process of unidirectional migration is used as an example for description. In the figure, a source node may be the first node, and a sink node may be the second node.

1201. In an initial state, a source node and a sink node transmit, in idle tributary slots, initial state information to each other.

The initial state information may indicate that a corresponding tributary slot is idle. For example, in FIG. 11, both TS 10 and TS 12 are idle tributary slots. The source node and the sink node may transmit, in TS 10, corresponding initial state information to each other. For example, the initial state information may be expressed as: {IDLE, 0, NACK}. The source node and the sink node may transmit, in TS 12, corresponding initial state information to each other, where the initial state information may be expressed as {IDLE, 0, NACK}.

1202. The source node selects, in the idle tributary slots, a destination tributary slot corresponding to TS 21, and selects a destination tributary slot corresponding to TS 22.

Herein, it is assumed that the source node selects TS 10 as the destination tributary slot corresponding to TS 21, and TS 12 as the destination tributary slot corresponding to TS 22.

1203. The source node separately initiates, in TS 10 and TS 12, a migration request to the sink node.

Specifically, the migration request sent in TS 10 may be used to request to migrate a low-order ODU service in TS 21 to TS 10, where the information may be specifically expressed as: {MOVE_REQ, #21, NACK}. The migration request sent in TS 12 may be used to request to migrate a low-order ODU service in TS 22 to TS 12, where the information may be specifically expressed as: {MOVE_REQ, #22, NACK}.

1204. The sink node separately initiates, in TS 10 and TS 12, a migration response to the source node according to the migration request of the source node.

Specifically, the migration response sent in TS 10 may be used to indicate that it is agreed to migrate the low-order ODU service in TS 21 to TS 10, where the information may be specifically expressed as: {IDLE, 0, ACK}. The migration response sent in TS 12 may be used to indicate that it is agreed to migrate the low-order ODU service in TS 22 to TS 12, where the information may be specifically expressed as: {IDLE, 0, ACK}.

1205. The source node separately sends, in TS 10 and TS 12, a migration implementation indication to the sink node according to the migration response of the sink node.

Specifically, the migration implementation indication sent in TS 10 may be used to indicate that an operation of migrating the low-order ODU service in TS 21 to TS 10 is to be executed, where the information may be specifically expressed as: {MOVE_DO, #21, ACK}. The migration implementation indication sent in TS 12 may be used to indicate that an operation of migrating the low-order ODU service in TS 22 to TS 12 is to be executed, where the information may be specifically expressed as: {MOVE_DO, #22, ACK}.

1206. The source node migrates a low-order ODU service in TS 21 to TS 10, and migrates a low-order ODU service in TS 22 to TS 12.

Specifically, the source node may migrate, after a first multi-frame, the low-order ODU service in TS 21 to TS 10, and migrate the low-order ODU service in TS 22 to TS 12. The first multi-frame may be an $x^{th}$ multi-frame after a multi-frame carrying the migration implementation indication. x is a positive integer greater than 1.

1207. The sink node separately acquires the low-order ODU services from TS 10 and TS 12.

Specifically, the sink node may separately acquire, after a first multi-frame, the low-order ODU services from TS 10 and TS 12.

1208. After the sink node acquires the low-order ODU services from TS 10 and TS 12, the source node and the sink node separately transmit, in TS 10 and TS 12, the initial state information to each other.

After the sink node extracts valid data, the source node and the sink node may send, in TS 10 and TS 12, the initial state information to each other again.

It can be seen that, in this embodiment, after the low-order ODU service in TS 21 and the low-order ODU service in TS 22 are separately migrated to TS 10 and TS 12, the existence of tributary slot fragments can be avoided, and OPLCn.n #3 no longer carries valid data, so that OPLCn.n #3 can be deleted; therefore, a quantity of OPLs can be flexibly adjusted, and moreover, utilization of network bandwidth resources can be improved.

Figure 13:
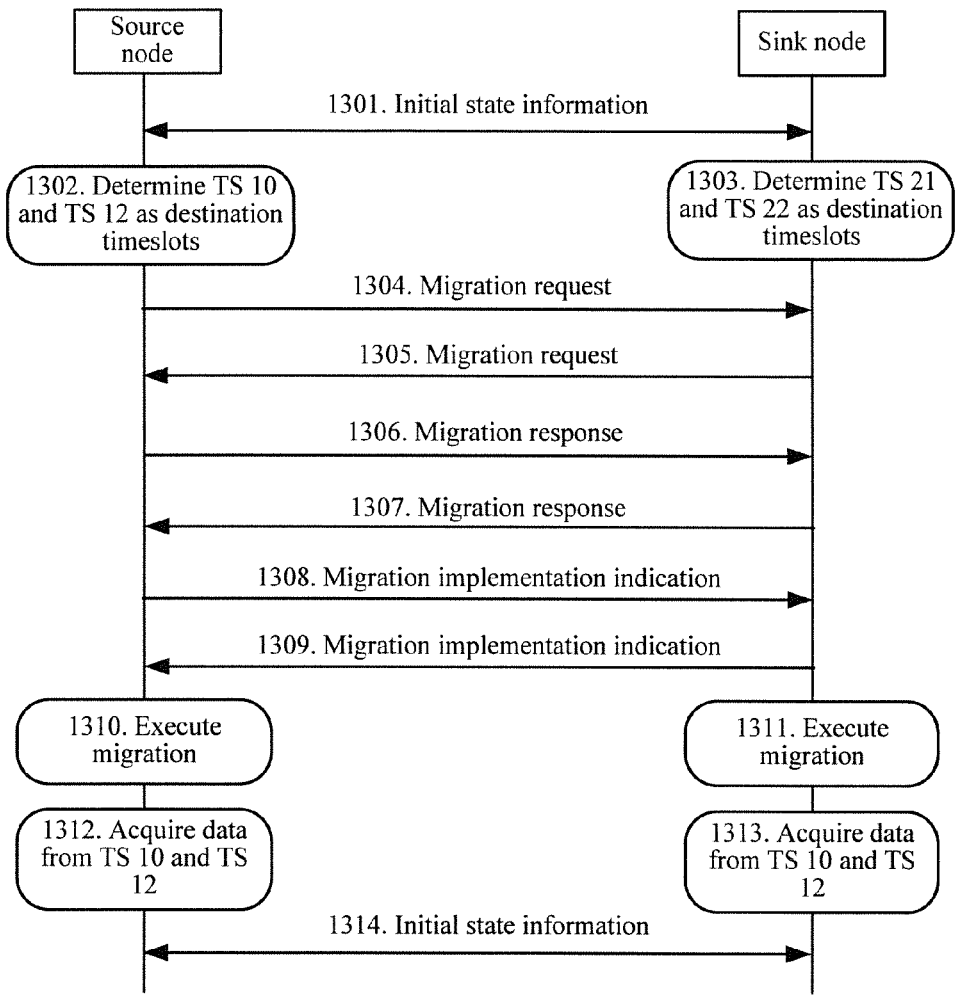
FIG. 13 is a schematic flowchart of a process of a data migration method according to another embodiment of the present invention.

FIG. 13 is a schematic flowchart of a process of a data migration method according to another embodiment of the present invention.

In FIG. 13, with reference to FIG. 11, a process of bidirectional migration is used as an example for description. In the figure, a source node may be the first node, and a sink node may be the second node. Alternatively, a source node may be the second node, and a sink node may be the first node. It is assumed that TS 21 carries a low-order ODU service 1 and a low-order ODU service 2, where a transmission direction of the low-order ODU service 1 is from the source node to the sink node, and a transmission direction of the low-order ODU service 2 is from the sink node to the source node. It is assumed that TS 22 carries a low-order ODU service 3 and a low-order ODU service 4, where a transmission direction of the low-order ODU service 3 is from the source node to the sink node, and a transmission direction of the low-order ODU service 4 is from the sink node to the source node.

1301. In an initial state, a source node and a sink node transmit, in idle tributary slots, initial state information to each other.

The initial state information may indicate that a corresponding tributary slot is idle. For example, in FIG. 11, both TS 10 and TS 12 are idle tributary slots. The source node and the sink node may transmit, in TS 10, corresponding initial state information to each other. For example, the initial state information may be expressed as: {IDLE, 0, NACK}. The source node and the sink node may transmit, in TS 12, corresponding initial state information to each other, where the initial state information may be expressed as {IDLE, 0, NACK}.

1302. The source node determines that tributary slots corresponding to TS 21 and TS 22 are TS 10 and TS 12 respectively.

Specifically, a destination tributary slot to which the low-order ODU service 1 in TS 21 is migrated is TS 10, and a destination tributary slot to which the low-order ODU service 3 in TS 22 is migrated is TS 12.

1303. The sink node determines that tributary slots corresponding to TS 21 and TS 22 are TS 10 and TS 12 respectively.

Specifically, a destination tributary slot to which the low-order ODU service 2 in TS 21 is migrated is TS 10, and a destination tributary slot to which the low-order ODU service 4 in TS 22 is migrated is TS 12.

1304. The source node separately initiates, in TS 10 and TS 12, a migration request to the sink node.

Specifically, the migration request sent in TS 10 may be used to request to migrate the low-order ODU service 1 in TS 21 to TS 10, where the information may be specifically expressed as: {MOVE_REQ, #21, NACK}. The migration request sent in TS 12 may be used to request to migrate the low-order ODU service 3 in TS 22 to TS 12, where the information may be specifically expressed as: {MOVE_REQ, #22, NACK}.

1305. The sink node separately initiates, in TS 10 and TS 12, a migration request to the source node.

Specifically, the migration request sent in TS 10 may be used to request to migrate the low-order ODU service 2 in TS 21 to TS 10, where the information may be specifically expressed as: {MOVE_REQ, #21, NACK}. The migration request sent in TS 12 may be used to request to migrate the low-order ODU service 4 in TS 22 to TS 12, where the information may be specifically expressed as: {MOVE_REQ, #22, NACK}.

1306. The source node separately initiates, in TS 10 and TS 12, a migration response to the sink node according to the migration request of the sink node.

Specifically, the migration response sent in TS 10 may be used to indicate that it is agreed to migrate the low-order ODU service 2 in TS 21 to TS 10, where the information may be specifically expressed as: {MOVE_REQ, #21, ACK}. The migration response sent in TS 12 may be used to indicate that it is agreed to migrate the low-order ODU service 4 in TS 22 to TS 12, where the information may be specifically expressed as: {MOVE_REQ, #22, ACK}.

1307. The sink node separately initiates, in TS 10 and TS 12, a migration response to the source node according to the migration request of the source node.

Specifically, the migration response sent in TS 10 may be used to indicate that it is agreed to migrate the low-order ODU service 1 in TS 21 to TS 10, where the information may be specifically expressed as: {MOVE_REQ, #21, ACK}. The migration response sent in TS 12 may be used to indicate that it is agreed to migrate the low-order ODU service 3 in TS 22 to TS 12, where the information may be specifically expressed as: {MOVE_REQ, #22, ACK}.

1308. The source node separately sends, in TS 10 and TS 12, a migration implementation indication to the sink node according to the migration response of the sink node.

Specifically, the migration implementation indication sent in TS 10 may be used to indicate that an operation of migrating the low-order ODU service 1 in TS 21 to TS 10 is to be executed, where the information may be specifically expressed as: {MOVE_DO, #21, ACK}. The migration implementation indication sent in TS 12 may be used to indicate that an operation of migrating the low-order ODU service 3 in TS 22 to TS 12 is to be executed, where the information may be specifically expressed as: {MOVE_DO, #22, ACK}.

1309. The sink node separately initiates, in TS 10 and TS 12, a migration implementation indication to the source node according to the migration response of the source node.

Specifically, the migration implementation indication sent in TS 10 may be used to indicate that an operation of migrating the low-order ODU service 2 in TS 21 to TS 10 is to be executed, where the information may be specifically expressed as: {MOVE_DO, #21, ACK}. The migration implementation indication sent in TS 12 may be used to indicate that an operation of migrating the low-order ODU service 4 in TS 22 to TS 12 is to be executed, where the information may be specifically expressed as: {MOVE_DO, #22, ACK}.

1310. The source node migrates a low-order ODU service 1 in TS 21 to TS 10, and migrates a low-order ODU service 3 in TS 22 to TS 12.

Specifically, the source node may migrate, after a first multi-frame, the low-order ODU service 1 in TS 21 to TS 10, and migrate the low-order ODU service 3 in TS 22 to TS 12. The first multi-frame may be an $x^{th}$ multi-frame after a multi-frame carrying the migration implementation indication. x is a positive integer greater than 1.

1311. The sink node migrates a low-order ODU service 2 in TS 21 to TS 10, and migrates a low-order ODU service 4 in TS 22 to TS 12.

Specifically, the source node may migrate, after a second multi-frame, the low-order ODU service 2 in TS 21 to TS 10, and migrate the low-order ODU service 4 in TS 22 to TS 12. The second multi-frame may be an $x^{th}$ multi-frame after a multi-frame carrying the migration implementation indication of the sink node.

1312. The source node separately acquires the low-order ODU service 2 and the low-order ODU service 4 from TS 10 and TS 12.

Specifically, the source node may separately acquire, after the second multi-frame, the low-order ODU service 2 and the low-order ODU service 4 from TS 10 and TS 12.

1313. The sink node separately acquires the low-order ODU service 1 and the low-order ODU service 3 from TS 10 and TS 12.

Specifically, the sink node may separately acquire, after the first multi-frame, the low-order ODU service 1 and the low-order ODU service 3 from TS 10 and TS 12.

1314. The source node and the sink node separately transmit, in TS 10 and TS 12, the initial state information.

It should be understood that sequence numbers of the foregoing processes do not mean an execution sequence. The execution sequence of the processes should be determined according to functions and internal logic of the processes, and should not constitute any limitation on the implementation processes of this embodiment of the present invention. For example, step 1302 and step 1303 may be performed at the same time, or step 1303 may be performed first, and then step 1302 is performed. Step 1304 and step 1305 may be performed at the same time, or step 1304 may be performed first, and then step 1303 is performed. Step 1306 and step 1307 may be performed at the same time, or step 1307 may be performed first, and then step 1306 is performed. Situations of step 1308 and step 1309, step 1310 and step 1311, and step 1312 and step 1313 are similar.

It can be seen that, in this embodiment, after the low-order ODU service in TS 21 and the low-order ODU service in TS 22 are separately migrated to TS 10 and TS 12, the existence of tributary slot fragments can be avoided, and OPLCn.n #3 no longer carries valid data, so that OPLCn.n #3 can be deleted; therefore, a quantity of OPLs can be flexibly adjusted, and moreover, utilization of network bandwidth resources can be improved.

Figure 14:
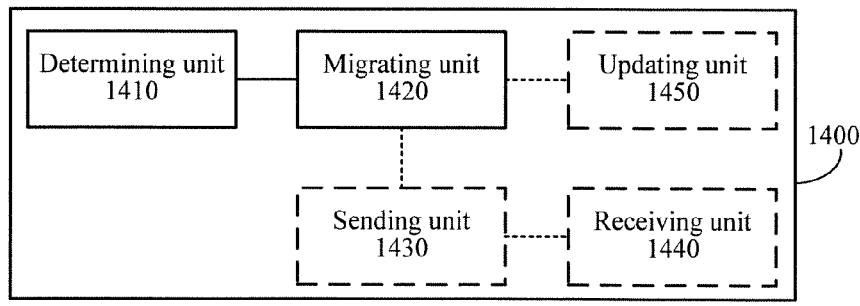
FIG. 14 is a schematic block diagram of a communications node according to an embodiment of the present invention.

FIG. 14 is a schematic block diagram of a communications node according to an embodiment of the present invention. A communications node 1400 of FIG. 14 includes a determining unit 1410 and a migrating unit 1420.

The determining unit 1410 determines, in an OPUCn signal, a second tributary slot corresponding to a first tributary slot, where the second tributary slot is an idle tributary slot. The migrating unit 1420 migrates a first low-order ODU service from the first tributary slot to the second tributary slot.

In this embodiment of the present invention, by migrating, in an OPUCn signal, a first low-order ODU service in a first tributary slot to an idle second tributary slot, the existence of tributary slot fragments can be avoided, thereby improving utilization of network bandwidth resources.

Optionally, as an embodiment, the determining unit 1410 may determine, according to a PSI of the OPUCn signal, idle tributary slots in the OPUCn signal, and may select the second tributary slot from the idle tributary slots.

Optionally, as another embodiment, the communications node 1400 may further include a sending unit 1430 and a receiving unit 1440.

The sending unit 1430 may send, in the second tributary slot, first migration information to a second node before the migrating unit 1420 migrates the first low-order ODU service from the first tributary slot to the second tributary slot, where the first migration information is used to request to migrate the first low-order ODU service from the first tributary slot to the second tributary slot. The receiving unit 1440 may receive second migration information that is sent by the second node in the second tributary slot according to the first migration information, where the second migration information is used to indicate that it is agreed to migrate the first low-order ODU service from the first tributary slot to the second tributary slot. The sending unit 1430 may further send, in the second tributary slot, third migration information to the second node according to the second migration information, where the third migration information is used to indicate that an operation of migrating the first low-order ODU service from the first tributary slot to the second tributary slot is to be executed. The migrating unit 1420 may migrate, after a first multi-frame, the first low-order ODU service from the first tributary slot to the second tributary slot, where the first multi-frame is an $x^{th}$ multi-frame after a multi-frame used to carry the third migration information, and x is a positive integer greater than 1.

Optionally, as another embodiment, the migrating unit 1420 may switch, by using a GMP, the first low-order ODU service from being mapped to the first tributary slot in a first ODTUCn.M to being mapped to the second tributary slot in a second ODTUCn.M, where the first ODTUCn.M includes M tributary slots in an OPUCn multi-frame, the second ODTUCn.M includes M tributary slots in the OPUCn multi-frame, and M is a positive integer.

Optionally, as another embodiment, the receiving unit 1440 may further receive fourth migration information that is sent by the second node in the second tributary slot, where the fourth migration information is used to request to migrate a second low-order ODU service from the first tributary slot to the second tributary slot. The sending unit 1430 may further send fifth migration information to the second node according to the fourth migration information, where the fifth migration information is used to indicate that it is agreed to migrate the second low-order ODU service from the first tributary slot to the second tributary slot. The receiving unit 1440 may further receive sixth migration information that is sent by the second node in the second tributary slot according to the fifth migration information, where the sixth migration information is used to indicate that an operation of migrating the second low-order ODU service from the first tributary slot to the second tributary slot is to be executed. The receiving unit 1440 may further receive, after a second multi-frame, the second low-order ODU service from the second tributary slot, where the second multi-frame is an $x^{th}$ multi-frame after a multi-frame used to carry the sixth migration information.

Optionally, as another embodiment, the communications node 1400 may further include an updating unit 1450.

The updating unit 1450 may update the PSI after the migrating unit 1420 migrates the first low-order ODU service from the first tributary slot to the destination tributary slot.

Optionally, as another embodiment, the multi-frame may be a t1-OPUCn multi-frame that is formed by t1 OPUCn signal frames; or, the multi-frame is a t2-OPUCn multi-frame that is formed by t2 OPUCn signal frames, where t1 is a quantity of tributary slots included in each optical channel payload lane in the OPUCn signal, t2 is a least common multiple of t1 and 256, and both t1 and t2 are positive integers.

For other functions and operations of the communications node 1400, reference may be made to the processes involving the first node in the foregoing FIG. 1 to FIG. 9 and FIG. 11 to FIG. 13, and details are not described again herein to avoid repetition.

Figure 15:
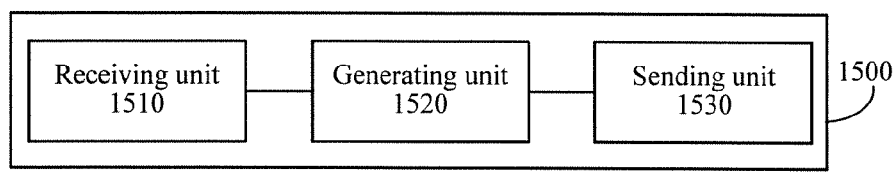
FIG. 15 is a schematic block diagram of a communications node according to another embodiment of the present invention.

FIG. 15 is a schematic block diagram of a communications node according to another embodiment of the present invention. A communications node 1500 of FIG. 15 includes a receiving unit 1510, a generating unit 1520, and a sending unit 1530.

The receiving unit 1510 receives first migration information sent in a second tributary slot by a first node, where the first migration information is used to request to migrate a first low-order ODU service from a first tributary slot to the second tributary slot, and the second tributary slot is an idle tributary slot. The generating unit 1520 generates second migration information according to the first migration information, where the second migration information is used to indicate that it is agreed to migrate the first low-order ODU service from the first tributary slot to the second tributary slot. The sending unit 1530 sends, in the second tributary slot, the second migration information to the first node. The receiving unit 1510 further receives third migration information that is sent by the first node in the second tributary slot according to the second migration information, where the third migration information is used to indicate that an operation of migrating the first low-order ODU service from the first tributary slot to the second tributary slot is to be executed. The receiving unit 1510 further receives the first low-order ODU service from the second tributary slot according to the third migration information.

In this embodiment of the present invention, a second node sends, to a first node according to first migration information of the first node, second migration information used to indicate that it is agreed to execute a migration operation, so that the first node may migrate a first low-order ODU service from a first tributary slot to an idle second tributary slot, so that the existence of tributary slot fragments can be avoided, thereby improving utilization of network bandwidth resources.

Optionally, as an embodiment, the receiving unit 1510 may receive, after a first multi-frame, the first low-order ODU service from the second tributary slot, where the first multi-frame is an $x^{th}$ multi-frame after a multi-frame used to carry the third migration information, and x is a positive integer greater than 1.

For other functions and operations of the communications node 1500, reference may be made to the processes involving the second node in the foregoing FIG. 6 to FIG. 10 and FIG. 11 to FIG. 12, and details are not described again herein to avoid repetition.

Figure 16:
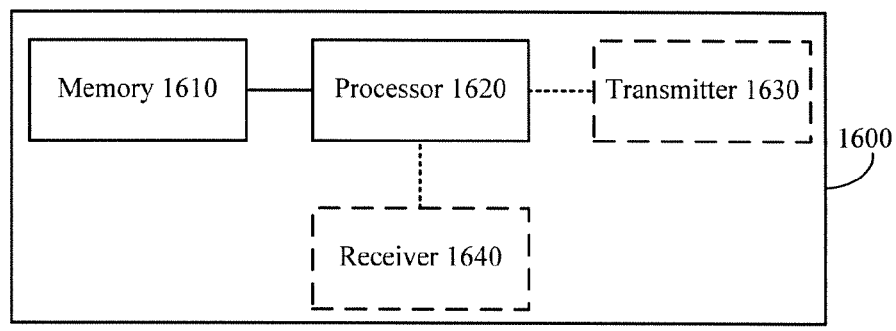
FIG. 16 is a schematic block diagram of a communications node according to another embodiment of the present invention.

FIG. 16 is a schematic block diagram of a communications node according to another embodiment of the present invention. The communications node 1600 of FIG. 16 includes a memory 1610 and a processor 1620.

The memory 1610 may include a random access memory, a flash memory, a read-only memory, a programmable read-only memory, a non-volatile memory, a register, or the like. The processor 1620 may be a central processing unit (CPU).

The memory 1610 is configured to store an executable instruction. The processor 1620 may execute the executable instruction stored in the memory 1610, and is configured to: determine, in an OPUCn signal, a second tributary slot corresponding to a first tributary slot, where the second tributary slot is an idle tributary slot; and migrate a first low-order ODU service from the first tributary slot to the second tributary slot.

In this embodiment of the present invention, by migrating, in an OPUCn signal, a first low-order ODU service of a first tributary slot to an idle second tributary slot, the existence of tributary slot fragments can be avoided, thereby improving utilization of network bandwidth resources.

Optionally, as an embodiment, the processor 1620 may determine, according to a payload structure identifier PSI of the OPUCn signal, idle tributary slots in the OPUCn signal, and may select the second tributary slot from the idle tributary slots.

Optionally, as another embodiment, the communications node 1600 may further include a transmitter 1630 and a receiver 1640.

The transmitter 1630 may send, in the second tributary slot, first migration information to a second node before the processor 1620 migrates the first low-order ODU service from the first tributary slot to the second tributary slot, where the first migration information is used to request to migrate the first low-order ODU service from the first tributary slot to the second tributary slot. The receiver 1640 may receive second migration information that is sent by the second node in the second tributary slot according to the first migration information, where the second migration information is used to indicate that it is agreed to migrate the first low-order ODU service from the first tributary slot to the second tributary slot. The transmitter 1630 may further send, in the second tributary slot, third migration information to the second node according to the second migration information, where the third migration information is used to indicate that an operation of migrating the first low-order ODU service from the first tributary slot to the second tributary slot is to be executed. The processor 1620 may migrate, after a first multi-frame, the first low-order ODU service from the first tributary slot to the second tributary slot, where the first multi-frame is an $x^{th}$ multi-frame after a multi-frame used to carry the third migration information, and x is a positive integer greater than 1.

Optionally, as another embodiment, the processor 1620 may switch, by using a GMP, the first low-order ODU service from being mapped to the first tributary slot in a first optical channel data tributary unit ODTUCn.M to being mapped to the second tributary slot in a second ODTUCn.M, where the first ODTUCn.M includes M tributary slots in an OPUCn multi-frame, the second ODTUCn.M includes M tributary slots in the OPUCn multi-frame, and M is a positive integer.

Optionally, as another embodiment, the receiver 1640 may further receive fourth migration information that is sent by the second node in the second tributary slot, where the fourth migration information is used to request to migrate a second low-order ODU service from the first tributary slot to the second tributary slot. The transmitter 1630 may further send fifth migration information to the second node according to the fourth migration information, where the fifth migration information is used to indicate that it is agreed to migrate the second low-order ODU service from the first tributary slot to the second tributary slot. The receiver 1640 may further receive sixth migration information that is sent by the second node in the second tributary slot according to the fifth migration information, where the sixth migration information is used to indicate that an operation of migrating the second low-order ODU service from the first tributary slot to the second tributary slot is to be executed. The receiver 1640 may further receive, after a second multi-frame, the second low-order ODU service from the second tributary slot, where the second multi-frame is an $x^{th}$ multi-frame after a multi-frame used to carry the sixth migration information.

Optionally, as another embodiment, the processor 1620 may update the PSI after the processor 1620 migrates the first low-order ODU service from the first tributary slot to the destination tributary slot.

Optionally, as another embodiment, the multi-frame may be a t1-OPUCn multi-frame that is formed by t1 OPUCn signal frames; or, the multi-frame is a t2-OPUCn multi-frame that is formed by t2 OPUCn signal frames, where t1 is a quantity of tributary slots included in each optical channel payload lane in the OPUCn signal, t2 is a least common multiple of t1 and 256, and both t1 and t2 are positive integers.

For other functions and operations of the communications node 1600, reference may be made to the processes involving the first node in the foregoing FIG. 1 to FIG. 9 and FIG. 11 to FIG. 13, and details are not described again herein to avoid repetition.

Figure 17:
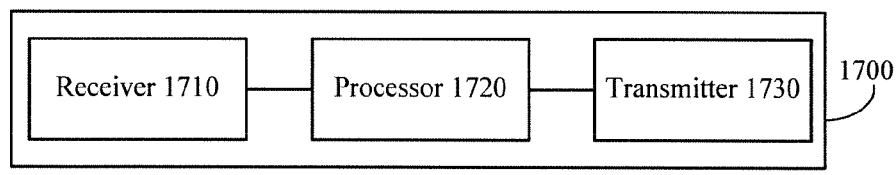
FIG. 17 is a schematic block diagram of a communications node according to another embodiment of the present invention.

FIG. 17 is a schematic block diagram of a communications node according to another embodiment of the present invention. The communications node 1700 of FIG. 17 includes a receiver 1710, a processor 1720, and a transmitter 1730.

The receiver 1710 receives first migration information sent in a second tributary slot by a first node, where the first migration information is used to request to migrate a first low-order ODU service from a first tributary slot to the second tributary slot, and the second tributary slot is an idle tributary slot. The processor 1720 generates second migration information according to the first migration information, where the second migration information is used to indicate that it is agreed to migrate the first low-order ODU service from the first tributary slot to the second tributary slot. The transmitter 1730 sends, in the second tributary slot, the second migration information to the first node. The receiver 1710 further receives third migration information that is sent by the first node in the second tributary slot according to the second migration information, where the third migration information is used to indicate that an operation of migrating the first low-order ODU service from the first tributary slot to the second tributary slot is to be executed. The receiver 1710 further receives the first low-order ODU service from the second tributary slot according to the third migration information.

In this embodiment of the present invention, a second node sends, to a first node according to first migration information of the first node, second migration information used to indicate that it is agreed to execute a migration operation, so that the first node may migrate a first low-order ODU service from a first tributary slot to an idle second tributary slot, so that the existence of tributary slot fragments can be avoided, thereby improving utilization of network bandwidth resources.

Optionally, as an embodiment, the receiver 1710 may receive, after a first multi-frame, the first low-order ODU service from the second tributary slot, where the first multi-frame is an $x^{th}$ multi-frame after a multi-frame used to carry the third migration information, and x is a positive integer greater than 1.

For other functions and operations of the communications node 1700, reference may be made to the processes involving the second node in the foregoing FIG. 6 to FIG. 10 and FIG. 11 to FIG. 12, and details are not described again herein to avoid repetition.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data migration method, comprising:
    determining, by a first node in an optical channel payload unit-Cn signal, a second tributary slot corresponding to a first tributary slot, wherein the second tributary slot is an idle tributary slot;

sending, by the first node in the second tributary slot, first migration information to a second node, the first migration information for requesting to migrate a first low-order optical channel data unit service from the first tributary slot to the second tributary slot, receiving, by the first node, second migration information that is sent by the second node in the second tributary slot according to the first migration information, the second migration information for indicating that it is agreed to migrate the first low-order optical channel data unit service from the first tributary slot to the second tributary slot;

sending, by the first node in the second tributary slot, third migration information to the second node according to the second migration information, the third migration information for indicating that an operation of migrating the first low-order optical channel data unit service from the first tributary slot to the second tributary slot is to be executed; and migrating, by the first node, the first low-order optical channel data unit service from the first tributary slot to the second tributary slot.

2. The method according to claim 1, wherein determining a second tributary slot corresponding to a first tributary slot comprises:

determining, by the first node, idle tributary slots in the optical channel payload unit-Cn signal according to a payload structure identifier of the optical channel payload unit-Cn signal; and selecting, by the first node, the second tributary slot from the idle tributary slots.

3. The method according to claim 1, wherein:

migrating, by the first node, the first low-order optical channel data unit service in the first tributary slot from the first tributary slot to the second tributary slot comprises:

migrating, by the first node after a first multi-frame, the first low-order optical channel data unit service from the first tributary slot to the second tributary slot, wherein the first multi-frame is an $x^{th}$ multi-frame after a multi-frame used to carry the third migration information, and x is a positive integer greater than 1.

4. The method according to claim 3, further comprising:

receiving, by the first node, fourth migration information sent by the second node in the second tributary slot, the fourth migration information for requesting to migrate a second low-order optical channel data unit service from the first tributary slot to the second tributary slot;

sending, by the first node, fifth migration information to the second node according to the fourth migration information, the fifth migration information for indicating that it is agreed to migrate the second low-order optical channel data unit service from the first tributary slot to the second tributary slot;

receiving, by the first node, sixth migration information that is sent by the second node in the second tributary slot according to the fifth migration information, the sixth migration information for indicating that an operation of migrating the second low-order optical channel data unit service from the first tributary slot to the second tributary slot is to be executed; and acquiring, by the first node after a second multi-frame, the second low-order optical channel data unit service from the second tributary slot, wherein the second multi-frame is an $x^{th}$ multi-frame after a multi-frame used to carry the sixth migration information.

5. The method according to claim 3, wherein the first multi-frame is a t1-optical channel payload unit-Cn multi-frame that is formed by t1 optical channel payload unit-Cn signal frames; or, the multi-frame is a t2-optical channel payload unit-Cn multi-frame that is formed by t2 optical channel payload unit-Cn signal frames, wherein t1 is a quantity of tributary slots comprised in each optical channel payload lane in the optical channel payload unit-Cn signal, t2 is a least common multiple of t1 and 256, and both t1 and t2 are positive integers.

6. The method according to claim 1, wherein migrating, by the first node, the first low-order optical channel data unit service from the first tributary slot to the second tributary slot comprises:

switching, by the first node by using a Generic Mapping Procedure, the first low-order optical channel data unit service from being mapped to the first tributary slot in a first optical channel data tributary unit-Cn.M to being mapped to the second tributary slot in a second optical channel data tributary unit-Cn.M, wherein the first optical channel data tributary unit-Cn.M comprises M tributary slots in an optical channel payload unit-Cn multi-frame, the second optical channel data tributary unit-Cn.M comprises M tributary slots in the optical channel payload unit-Cn multi-frame, and M is a positive integer.

7. The method according to claim 2, wherein after migrating, by the first node, the first low-order optical channel data unit service from the first tributary slot to the second tributary slot, the method further comprises:

updating, by the first node, the payload structure identifier.

8. A communications node, comprising:

a processor; and a computer readable medium having a plurality of computer executable instructions that, when executed by the processor, cause the processor to:

determine, in an optical channel payload unit-Cn signal, a second tributary slot corresponding to a first tributary slot, wherein the second tributary slot is an idle tributary slot, send, in the second tributary slot, first migration information to a second node, the first migration information for requesting to migrate a first low-order optical channel data unit service from the first tributary slot to the second tributary slot, receive second migration information that is sent by the second node in the second tributary slot according to the first migration information, the second migration information for indicating that it is agreed to migrate a first low-order optical channel data unit service from the first tributary slot to the second tributary slot, send, in the second tributary slot, third migration information to the second node according to the second migration information, the third migration information for indicating that an operation of migrating the first low-order optical channel data unit service from the first tributary slot to the second tributary slot is to be executed, and migrate the first low-order optical channel data unit service from the first tributary slot to the second tributary slot.

9. The communications node according to claim 8, wherein the computer executable instructions, when executed by the processor, further cause the processor to:

determine idle tributary slots in the optical channel payload unit-Cn signal according to a payload structure identifier of the optical channel payload unit-Cn signal; and select the second tributary slot from the idle tributary slots.

10. The communications node according to claim 8, wherein the computer executable instructions, when executed by the processor, further cause the processor to:

migrate, after a first multi-frame, the first low-order optical channel data unit service from the first tributary slot to the second tributary slot, wherein the first multi-frame is an $x^{th}$ multi-frame after a multi-frame used to carry the third migration information, and x is a positive integer greater than 1.

11. The communications node according to claim 10, wherein the computer executable instructions, when executed by the processor, further cause the processor to:

receive fourth migration information sent by the second node in the second tributary slot, the fourth migration information for requesting to migrate a second low-order optical channel data unit service from the first tributary slot to the second tributary slot;

send fifth migration information to the second node according to the fourth migration information, the fifth migration information for indicating that it is agreed to migrate the second low-order optical channel data unit service from the first tributary slot to the second tributary slot;

receive sixth migration information that is sent by the second node in the second tributary slot according to the fifth migration information, the sixth migration information for indicating that an operation of migrating the second low-order optical channel data unit service from the first tributary slot to the second tributary slot is to be executed; and receive, after a second multi-frame, the second low-order optical channel data unit service from the second tributary slot, wherein the second multi-frame is an $x^{th}$ multi-frame after a multi-frame used to carry the sixth migration information.

12. The communications node according to claim 8, wherein the computer executable instructions, when executed by the processor, further cause the processor to:

switch, by using a Generic Mapping Procedure, the first low-order optical channel data unit service from being mapped to the first tributary slot in a first optical channel data tributary unit-Cn.M to being mapped to the second tributary slot in a second optical channel data tributary unit-Cn.M, wherein the first optical channel data tributary unit-Cn.M comprises M tributary slots in an optical channel payload unit-Cn multi-frame, the second optical channel data tributary unit-Cn.M comprises M tributary slots in the optical channel payload unit-Cn multi-frame, and M is a positive integer.

13. The communications node according to claim 9, wherein the computer executable instructions, when executed by the processor, further cause the processor to:

update the payload structure identifier after migrating the first low-order optical channel data unit service from the first tributary slot to the second tributary slot.

14. A data migration method, comprising:

receiving, by a second node, first migration information sent by a first node in a second tributary slot, the first migration information for requesting to migrate a first low-order optical channel data unit service from a first tributary slot to the second tributary slot, and the second tributary slot is an idle tributary slot;

sending, by the second node in the second tributary slot, second migration information to the first node according to the first migration information, the second migration information for indicating that it is agreed to migrate the first low-order optical channel data unit service from the first tributary slot to the second tributary slot;

receiving, by the second node, third migration information that is sent by the first node in the second tributary slot according to the second migration information, the third migration information for indicating that an operation of migrating the first low-order optical channel data unit service from the first tributary slot to the second tributary slot is to be executed; and acquiring, by the second node, the first low-order optical channel data unit service from the second tributary slot according to the third migration information.

15. The method according to claim 14, wherein acquiring, by the second node, the first low-order optical channel data unit service from the second tributary slot according to the third migration information comprises:

acquiring, by the second node after a first multi-frame, the first low-order optical channel data unit service from the second tributary slot, wherein the first multi-frame is an $x^{th}$ multi-frame after a multi-frame used to carry the third migration information, and x is a positive integer greater than 1.

16. A communications node, comprising:

a processor; and a computer readable medium having a plurality of computer executable instructions that, when executed by the processor, cause the processor to:

receive first migration information sent by a first node in a second tributary slot, the first migration information for requesting to migrate a first low-order optical channel data unit service from a first tributary slot to the second tributary slot, and the second tributary slot is an idle tributary slot, generate second migration information according to the first migration information, the second migration information for indicating that it is agreed to migrate the first low-order optical channel data unit service from the first tributary slot to the second tributary slot, send, in the second tributary slot, the second migration information to the first node, receive third migration information that is sent by the first node in the second tributary slot according to the second migration information, the third migration information for indicating that an operation of migrating the first low-order optical channel data unit service from the first tributary slot to the second tributary slot is to be executed, and receive the first low-order optical channel data unit service from the second tributary slot according to the third migration information.

17. The communications node according to claim 16, wherein the computer executable instructions, when executed by the processor, further cause the processor to:

receive, after a first multi-frame, the first low-order optical channel data unit service from the second tributary slot, wherein the first multi-frame is an $x^{th}$ multi-frame after a multi-frame used to carry the third migration information, and x is a positive integer greater than 1.

* * * * *